(12) United States Patent
Chen et al.

(10) Patent No.: US 10,424,326 B1
(45) Date of Patent: Sep. 24, 2019

(54) MAGNETIC FLUX GUIDING DEVICE WITH ANTIFERROMAGNETICALLY COUPLED (AFC) SPIN POLARIZER IN ASSISTED WRITING APPLICATION

(71) Applicant: Headway Technologies, Inc., Milpitas, CA (US)

(72) Inventors: Wenyu Chen, San Jose, CA (US); Shohei Kawasaki, Sunnyvale, CA (US); Tetsuya Roppongi, San Jose, CA (US); Yan Wu, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/197,586

(22) Filed: Nov. 21, 2018

(51) Int. Cl.
*G11B 5/39* (2006.01)
*G11B 5/48* (2006.01)
*G11B 5/60* (2006.01)

(52) U.S. Cl.
CPC .......... *G11B 5/3916* (2013.01); *G11B 5/4826* (2013.01); *G11B 5/6082* (2013.01)

(58) Field of Classification Search
CPC .... G11B 5/3916; G11B 5/4826; G11B 5/6082
USPC ...................................................... 360/125.3
See application file for complete search history.

(56) References Cited

U.S. PATENT DOCUMENTS

| | | | |
|---|---|---|---|
| 6,785,092 B2 | 8/2004 | Covington et al. | |
| 6,809,899 B1 | 10/2004 | Chen et al. | |
| 6,954,340 B2 | 10/2005 | Shukh et al. | |
| 7,009,812 B2 | 3/2006 | Hsu et al. | |
| 7,589,600 B2 | 9/2009 | Dimitrov et al. | |
| 7,724,469 B2 | 5/2010 | Gao et al. | |
| 7,835,111 B2 | 11/2010 | Flint et al. | |

(Continued)

FOREIGN PATENT DOCUMENTS

| | | |
|---|---|---|
| JP | 2002-133610 | 5/2002 |
| JP | 2002-298309 | 10/2002 |

(Continued)

OTHER PUBLICATIONS

PTO Office Action, U.S. Appl. No. 12/964,202, Applicant: Sasaki et al., Notification dated Nov. 28, 2012, 11 pages.

(Continued)

*Primary Examiner* — Allen T Cao
(74) *Attorney, Agent, or Firm* — Saile Ackerman LLC; Stephen B. Ackerman

(57) ABSTRACT

A spin torque transfer (STT) assisted magnetic recording structure is disclosed wherein a magnetic flux guiding (MFG) device is formed between a main pole (MP) trailing side and a trailing shield (TS). The MFG device has a field generation layer (FGL) separated from first and second spin polarization (SP) layers by first and second non-magnetic layers, respectively. First and second SP layers have magnetizations in opposite directions so that when a direct current of sufficient magnitude is applied from the MP to TS, or from the TS to MP in other embodiments, FGL magnetization flips to a direction toward the MP and opposes a write gap field flux thereby enhancing the write field. Additive torque from two SP layers on the FGL enables lower current density for FGL flipping or a greater degree of FGL flipping at a given current density compared with MFG schemes having a single SP layer.

36 Claims, 19 Drawing Sheets

(56) References Cited

U.S. PATENT DOCUMENTS

| | | |
|---|---|---|
| 7,957,098 B2 | 6/2011 | Yamada et al. |
| 7,963,024 B2 | 6/2011 | Neuhaus |
| 7,978,442 B2 | 7/2011 | Zhang et al. |
| 7,982,996 B2 | 7/2011 | Smith et al. |
| 8,027,110 B1 | 9/2011 | Yamanaka et al. |
| 8,064,244 B2 | 11/2011 | Zhang et al. |
| 8,068,312 B2 | 11/2011 | Jiang et al. |
| 8,154,825 B2 | 4/2012 | Takeshita et al. |
| 8,203,389 B1 | 6/2012 | Zhou et al. |
| 8,264,792 B2 | 9/2012 | Bai et al. |
| 8,270,112 B2 | 9/2012 | Funayama et al. |
| 8,295,008 B1 | 10/2012 | Sasaki et al. |
| 8,310,787 B1 | 11/2012 | Sasaki et al. |
| 8,320,079 B2 | 11/2012 | Iwasaki et al. |
| 8,427,781 B1 | 4/2013 | Sasaki et al. |
| 8,446,690 B2 | 5/2013 | Alex et al. |
| 8,462,461 B2 | 6/2013 | Braganca et al. |
| 8,477,452 B2 | 7/2013 | Sasaki et al. |
| 8,493,687 B2 | 7/2013 | Sasaki et al. |
| 8,582,240 B1 | 11/2013 | Chen et al. |
| 8,582,241 B1 | 11/2013 | Yu et al. |
| 8,604,886 B2 | 12/2013 | Nikonov et al. |
| 8,634,163 B2 | 1/2014 | Tanabe et al. |
| 8,749,919 B2 | 6/2014 | Sasaki et al. |
| 8,767,347 B1 | 7/2014 | Sasaki et al. |
| 8,792,210 B2 | 7/2014 | de la Fuente et al. |
| 9,142,228 B2 | 9/2015 | Fujita et al. |
| 9,230,571 B1 | 1/2016 | Chen et al. |
| 9,299,367 B1 | 3/2016 | Tang et al. |
| 9,355,654 B1* | 5/2016 | Mallary ................ G11B 5/1278 |
| 9,361,912 B1 | 6/2016 | Liu et al. |
| 9,406,317 B1 | 8/2016 | Tang et al. |
| 9,466,319 B1 | 10/2016 | Tang et al. |
| 9,824,701 B2 | 11/2017 | Tang et al. |
| 9,934,797 B2 | 4/2018 | Takahashi et al. |
| 9,966,091 B1 | 5/2018 | Chen et al. |
| 10,032,469 B2 | 7/2018 | Lim et al. |
| 10,032,470 B1* | 7/2018 | Degawa ................ G11B 5/314 |
| 10,037,772 B2 | 7/2018 | Okamura et al. |
| 10,109,302 B1* | 10/2018 | Shinohara ............ G11B 5/1278 |
| 10,121,497 B1* | 11/2018 | Takahashi ............ G11B 5/1278 |
| 2002/0034043 A1 | 3/2002 | Okada et al. |
| 2004/0150910 A1 | 8/2004 | Okada et al. |
| 2005/0128637 A1 | 6/2005 | Johnston et al. |
| 2005/0141137 A1 | 6/2005 | Okada et al. |
| 2006/0044682 A1 | 3/2006 | Le et al. |
| 2006/0087765 A1 | 4/2006 | Iwakura et al. |
| 2006/0103978 A1 | 5/2006 | Takano et al. |
| 2007/0177301 A1 | 8/2007 | Ilan et al. |
| 2008/0013209 A1 | 1/2008 | Sasaki et al. |
| 2008/0088972 A1 | 4/2008 | Sasaki et al. |
| 2009/0059426 A1 | 3/2009 | Sasaki et al. |
| 2009/0080106 A1 | 3/2009 | Shimizu et al. |
| 2009/0128953 A1 | 5/2009 | Jiang et al. |
| 2009/0296275 A1 | 12/2009 | Sasaki et al. |
| 2010/0165517 A1 | 7/2010 | Araki et al. |
| 2011/0211271 A1 | 9/2011 | Ng et al. |
| 2012/0292723 A1 | 11/2012 | Luo et al. |
| 2014/0071562 A1 | 3/2014 | Chen et al. |
| 2014/0177092 A1 | 6/2014 | Katada et al. |
| 2015/0043106 A1 | 2/2015 | Yamada et al. |
| 2016/0218728 A1 | 7/2016 | Zhu |
| 2017/0133044 A1 | 5/2017 | Lim et al. |
| 2018/0075868 A1 | 3/2018 | Koui et al. |

FOREIGN PATENT DOCUMENTS

| | | |
|---|---|---|
| JP | 2008-021398 | 1/2008 |
| JP | 2010-157303 | 7/2010 |

OTHER PUBLICATIONS

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.

Microwave Assisted Magnetic Recording, by Jian-Gang Zhu et al., IEEE Transactions on Magnetics, vol. 44, No. 1, Jan. 1, 2008, pp. 125-131.

Nov. 13, 2012, Office Action issued in Japanese Patent Application No. 2011-149242, with English language translation.

Nov. 13, 2012, Office Action issued in Japanese Patent Application No. 2011-149243, with English language translation.

Nov. 13, 2012, Office Action issued in Japanese Patent Application No. 2011-149244, with English language translation.

"Spin-Torque Oscillator Based on Magnetic Tunnel Junction with a Perpendicularly Magnetized Free Layer and In-Plane Magnetized Polarizer," by Hitoshi Kubota, et al., 2013 The Japan Society of Applied Physics, Applied Physics Express 6 (2013) 103003, Sep. 27, 2013, pp. 1-3.

"High-Power Coherent Microwave Emission from Magnetic Tunnel Junction Nano-oscillators with Perpendicular Anisotropy," by Zhongming Zeng, et al, 2012 American Chemical Society, Jun. 4, 2012, vol. 6, No. 7, pp. 6115-6121.

* cited by examiner

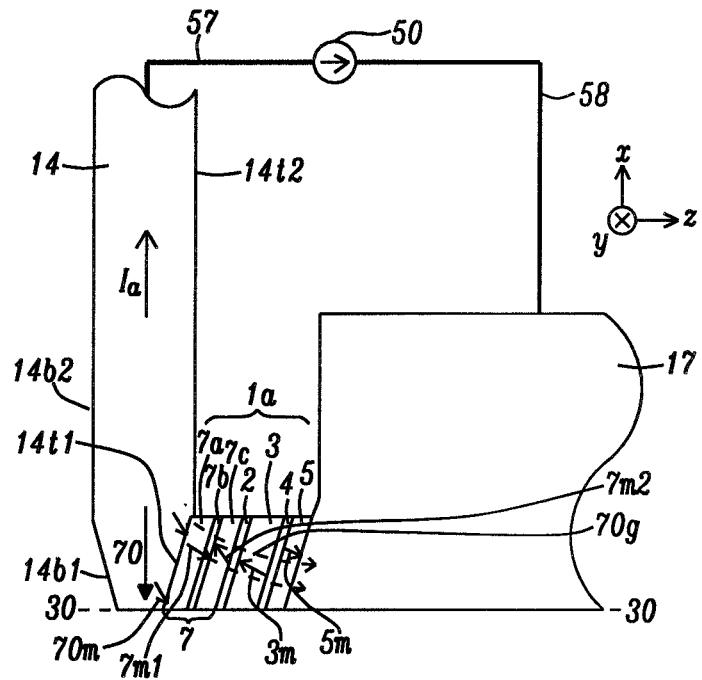
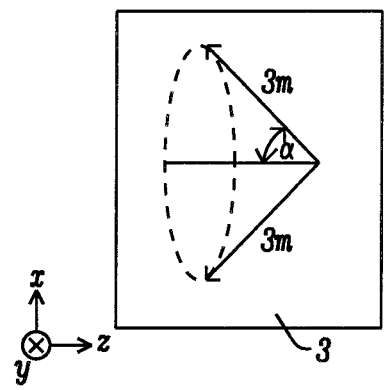
FIG. 8B  FIG. 8C
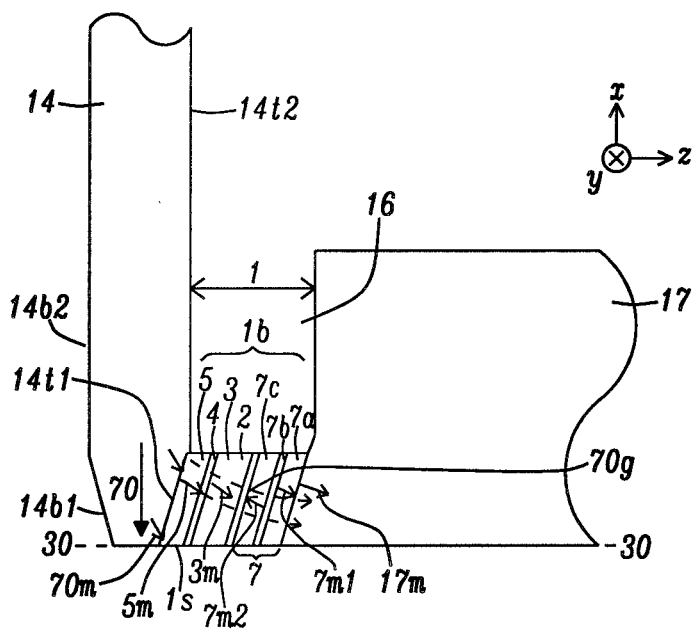
FIG. 9A

MAGNETIC FLUX GUIDING DEVICE WITH ANTIFERROMAGNETICALLY COUPLED (AFC) SPIN POLARIZER IN ASSISTED WRITING APPLICATION

RELATED PATENT APPLICATIONS

This application is related to the following: U.S. Pat. Nos. 9,230,571; 9,966,091; Ser. No. 16/037,197, filed on Jul. 17, 2018; and Ser. No. 16/209,151, filed on Dec. 4, 2018; assigned to a common assignee, and herein incorporated by reference in their entirety.

TECHNICAL FIELD

The present disclosure relates to a design for a magnetic flux guiding device in a spin torque assisted magnetic recording structure wherein a flux guiding layer (FGL) magnetization flips to an opposite direction when a current ($I_a$) of sufficient density is applied thereby enhancing the main pole write field, and wherein spin polarization (SP) layers on each side of the FGL generate an additive torque to allow a reduced $I_a$ for FGL flipping, or a greater degree of FGL flipping at a constant $I_a$ thereby reducing power consumption and improving device reliability.

BACKGROUND

As the data areal density in hard disk drive (HDD) writing increases, write heads and media bits are both required to be made in smaller sizes. However, as the write head size shrinks, its writability degrades. To improve writability, new technology is being developed that assists writing to a media bit. Two main approaches currently being investigated are thermally assisted magnetic recording (TAMR) and microwave assisted magnetic recording (MAMR). The latter is described by J-G. Zhu et al. in "Microwave Assisted Magnetic Recording", IEEE Trans. Magn., vol. 44, pp. 125-131 (2008). MAMR uses a spin torque device to generate a high frequency field that reduces the coercive field of a medium bit thereby allowing the bit to be switched with a lower main pole field.

Spin transfer (spin torque) devices are based on a spin-transfer effect that arises from the spin dependent electron transport properties of ferromagnetic-spacer-ferromagnetic multilayers. When a spin-polarized current passes through a magnetic multilayer in a CPP (current perpendicular to plane) configuration, the spin angular moment of electrons incident on a ferromagnetic layer interacts with magnetic moments of the ferromagnetic layer near the interface between the ferromagnetic and non-magnetic spacer. Through this interaction, the electrons transfer a portion of their angular momentum to the ferromagnetic layer. As a result, spin-polarized current can switch the magnetization direction of the ferromagnetic layer if the current density is sufficiently high. Spin transfer devices are also known as spintronic devices and may have ferromagnetic (FM) layers with a perpendicular magnetic anisotropy (PMA) component where magnetization is aligned substantially perpendicular to the plane of the FM layer. These devices have an advantage over devices based on in-plane anisotropy in that they can satisfy the thermal stability requirement but also have no limit of cell aspect ratio. As a result, spintronic structures based on PMA are capable of scaling for higher packing density, which is a key challenge for future MRAM (Magnetoresistive Random Access Memory) applications and for other spintronic devices such as microwave generators. However, magnetic layers with PMA are not a necessity in MAMR applications MAMR typically operates with the application of a bias current from the main pole (MP) across a spin torque oscillator (STO) device to a trailing shield, or vice versa, in order to generate a high frequency RF field (from an oscillation layer) while a MP field is applied from an air bearing surface (ABS) to the magnetic medium. In existing designs, spin torque is applied from only one side of the oscillation layer (OL) in the STO device. Related U.S. patent application Ser. No. 16/037,197 discloses a magnetic flux guiding device wherein a high frequency RF field is not necessarily generated. Preferably, FGL magnetization flips to an opposite direction when the applied current is sufficiently large enough. Accordingly, the write gap field flux from the MP to the trailing shield is reduced to enable a greater main pole field from the ABS to the magnetic medium. Since the required applied current for optimum FGL flipping is near the maximum value that can be tolerated to ensure good device reliability, there is a need to design an improved magnetic flux guiding device that operates with a considerable reduction in applied current. Alternatively, a magnetic flux guiding device that enables a higher degree of FGL magnetization flipping at a given current density is desirable.

SUMMARY

One objective of the present disclosure is to provide a magnetic flux guiding device that enables a reduced current density to flip a FGL magnetization thereby enhancing a main pole field to a magnetic medium and improving device reliability.

A second objective of the present disclosure is to provide a magnetic flux guiding device that enables a greater degree of FGL magnetization flipping at a given current density.

A third objective of the present disclosure is to provide a method of forming the magnetic flux guiding device according to the first and second objectives.

According to one embodiment of the present invention, these objectives are achieved with a writer design wherein a magnetic flux guiding device is formed between a main pole and a trailing shield, and within a write gap. Leads from the main pole and trailing shield are connected to a direct current (dc) source that provides an applied current (Ia) across the device during a write process. The magnetic flux guiding device has a stack of layers with an antiferromagnetically coupled (AFC) SP layer, first non-magnetic spacer (NM1), FGL, second non-magnetic spacer (NM2), and a second (top) SP layer sequentially formed on a main pole (MP) tapered trailing side at the ABS to yield a AFC SP/NM1/FGL/NM2/SP configuration. The AFC SP layer has a first SP sub-layer (SP1) contacting the MP with a magnetization substantially along the gap field flux direction between the MP and TS, a middle AFC coupling layer such as Ru, Ir, or Rh, and a second SP sub-layer (SP2) with a magnetization substantially anti-parallel to that of SP1, and where SP2 adjoins NM1. The top SP layer has a magnetization parallel to SP1 and FGL magnetizations, but anti-parallel to SP2 magnetization in the absence of an applied current. When a current ($I_a$) of sufficient magnitude (density) is applied from the trailing shield (TS) to the MP during a write process, FGL magnetization flips to an opposite direction (opposite to the write gap field flux) thereby enhancing the write field on the magnetic medium. A key feature is the AFC SP layer and top SP layer are configured such that SP2 and the top SP layer generate additive torque on the FGL magnetization to enable FGL flipping at a lower $I_a$ density, or alternatively, provide a higher degree of FGL flipping at a given $I_a$ density compared with a single SP layer in the magnetic flux guiding device.

In a second embodiment, the features of the first embodiment are retained except the positions of the SP and AFC SP layers are switched such that the SP layer contacts the MP and the AFC SP1 layer adjoins the trailing shield. Again, the additive torque from the SP layer and AFC SP2 layer on the FGL that is generated with $I_a$ (in this case from the MP to the trailing shield) results in FGL magnetization flipping at a lower $I_a$ density, or alternatively, provides a higher degree of FGL flipping at a given $I_a$ density compared with a single SP layer in the magnetic flux guiding device.

According to a third embodiment that is a modification of the first embodiment, the single SP layer contacting the TS is replaced by a triple AFC SP layer to yield an AFC SP/NM1/FGL/NM2/triple AFC SP configuration for the magnetic flux guiding device. The triple AFC SP layer is a stack of layers wherein a third sub-layer (TSP3), second AFC coupling layer, second sub-layer (TSP2), first AFC coupling layer, and first sub-layer (TSP1) are sequentially formed on NM2. TSP1 (adjoining the TS) and TSP3 have magnetizations pointing substantially up (toward the TS), and TSP2 magnetization is anti-parallel to that of TSP1 and TSP2. When sufficient $I_a$ is applied from the TS to MP, additive torque from TSP3 and SP2 causes FGL magnetization to flip at a lower $I_a$ density than when only a single SP layer is adjacent to the FGL, or provides a greater degree of FGL flipping at a given current density.

The fourth embodiment is a modification of the second embodiment. In particular, the single SP layer contacting the MP is replaced with a triple AFC SP layer to yield a triple AFC SP/NM1/FGL/NM2/AFC SP configuration for the magnetic flux guiding device. The triple AFC SP layer retains the same stack of layers from the third embodiment except TSP1 contacts the MP, and the first AFC layer, TSP2, second AFC layer, and TSP3 are sequentially formed on TSP1. Again, TSP1 and TSP3 magnetizations are pointing substantially up (toward the TS), and TSP2 magnetization is anti-parallel to that of TSP1 and TSP3. When sufficient $I_a$ is applied from the MP to TS, additive torque from TSP3 and SP2 causes FGL magnetization to flip to a direction substantially anti-parallel to the write gap field flux thereby enhancing the MP write field on a magnetic medium.

Fifth through seventh embodiments are modifications of the first embodiment wherein one or both of the SP and SP1 layers are merged into the TS and MP, respectively, to enable a thinner magnetic flux guiding device. Therefore, MP magnetization at the interface with the AFC layer (when SP1 is absent) is anti-parallel to that of SP2 magnetization. Also, when the SP layer is absent, TS magnetization at the interface with the NM2 layer is substantially parallel to FGL magnetization in the absence of $I_a$. FGL magnetization flips to a direction substantially pointing down (toward the MP) when $I_a$ is applied from the TS to MP.

Eighth through tenth embodiments are modifications of the second embodiment wherein one or both of the SP and SP1 layers are merged into the MP and TS, respectively. Here, TS magnetization at the interface with the AFC layer (when SP1 is absent) is anti-parallel to that of SP2 magnetization. Also, when the SP layer is absent, MP magnetization at the interface with the NM1 layer is substantially parallel to FGL magnetization in the absence of $I_a$. FGL magnetization flips to a direction substantially pointing down (toward the MP) when $I_a$ is applied from the MP to TS.

Eleventh through thirteenth embodiments are modifications of the third embodiment wherein one or both of the TSP1 and SP1 layers are merged into the TS and MP, respectively. FGL magnetization flips to a direction substantially pointing down (toward the MP) when $I_a$ is applied from the TS to the MP.

Fourteenth through sixteenth embodiments are modifications of the fourth embodiment wherein one or both of the TSP1 and SP1 layers are merged into the MP and TS, respectively. Thus, MP magnetization at the interface with the first AFC layer (when TSP1 is absent) is substantially parallel to FGL magnetization. When SP1 is absent, TS magnetization at the interface with the AFC layer is anti-parallel to that of SP2 magnetization. In these three embodiments, FGL magnetization flips to a direction substantially pointing down (toward the MP) when $I_a$ is applied from the MP to the TS.

The present disclosure also encompasses a process flow for forming a magnetic flux guiding device between a MP and TS according to an embodiment described herein.

BRIEF DESCRIPTION OF THE DRAWINGS

FIGS. 8A-8B depict a first embodiment of the present disclosure wherein a magnetic flux guiding device has a bottom AFC SP layer and a top SP layer, and FGL magnetization flips when a current is applied from the trailing shield (TS) to the main pole (MP).

FIG. 8C illustrates a cone angle of a flipped FGL magnetization in a precessional state according to embodiments of the present disclosure.

FIGS. 9A-9B depict a second embodiment of the present disclosure wherein a magnetic flux guiding device has a top AFC SP layer and a bottom SP layer, and FGL magnetization flips when a current ($I_a$) is applied from the MP to the TS.

DETAILED DESCRIPTION

Figure 1:
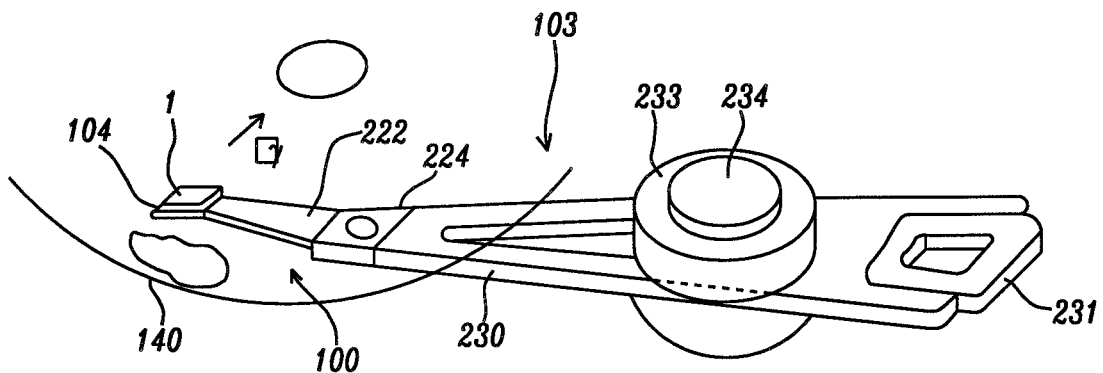
FIG. 1 is a perspective view of a head arm assembly of the present disclosure.

The present disclosure is a writer structure wherein a magnetic flux guiding device is formed between a main pole and a first trailing shield, and a process for making the same. The magnetic flux guiding device has two SP layers, including at least one AFC SP layer, adjacent to opposite sides of a FGL, thereby generating additive torque to flip the FGL magnetization to a direction substantially anti-parallel to the write gap field flux when a current of sufficient magnitude is applied. In the drawings, the y-axis is in a cross-track direction, the z-axis is in a down-track direction, and the x-axis is in a direction orthogonal to the ABS and towards a back end of the writer structure. Thickness refers to a down-track distance, width is a cross-track distance, and height is a distance from the ABS in the x-axis direction. In some of the drawings, a magnetic bit is considerably enlarged over actual size in order to more easily depict a magnetization therein. The term "higher degree of flipping" means that FGL magnetization is flipped closer to a direction that is opposite to the write gap field flux direction. The terms "MP field" and "write field" may be used interchangeably.

Referring to FIG. 1, a head gimbal assembly (HGA) 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
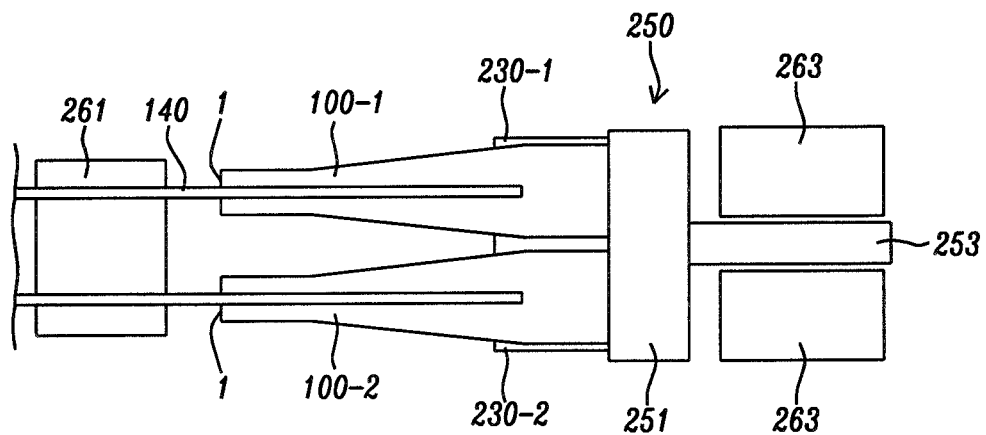
FIG. 2 is side view of a head stack assembly of the present disclosure.

Next, a side view of a head stack assembly (FIG. 2) and a plan view of a magnetic recording apparatus (FIG. 3) wherein the magnetic recording head 1 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
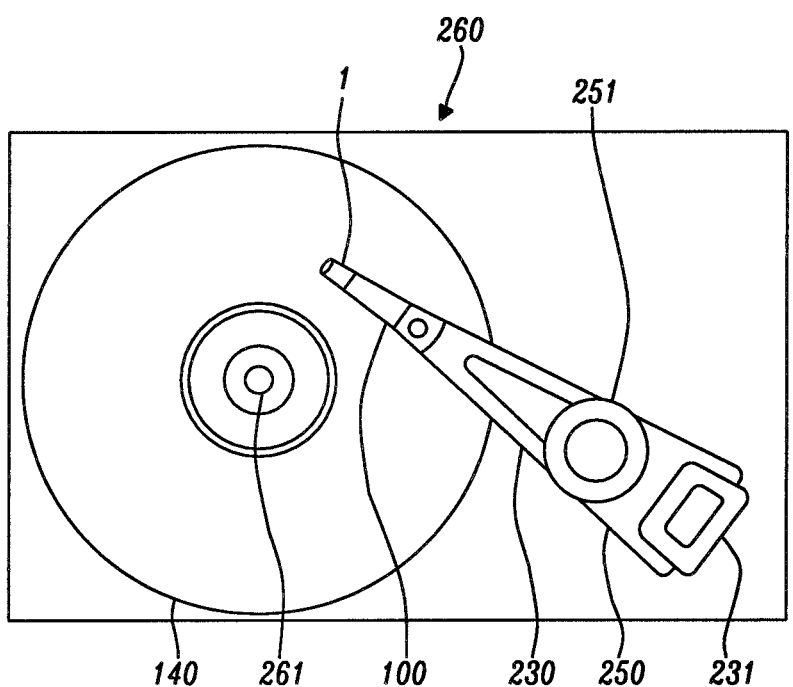
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
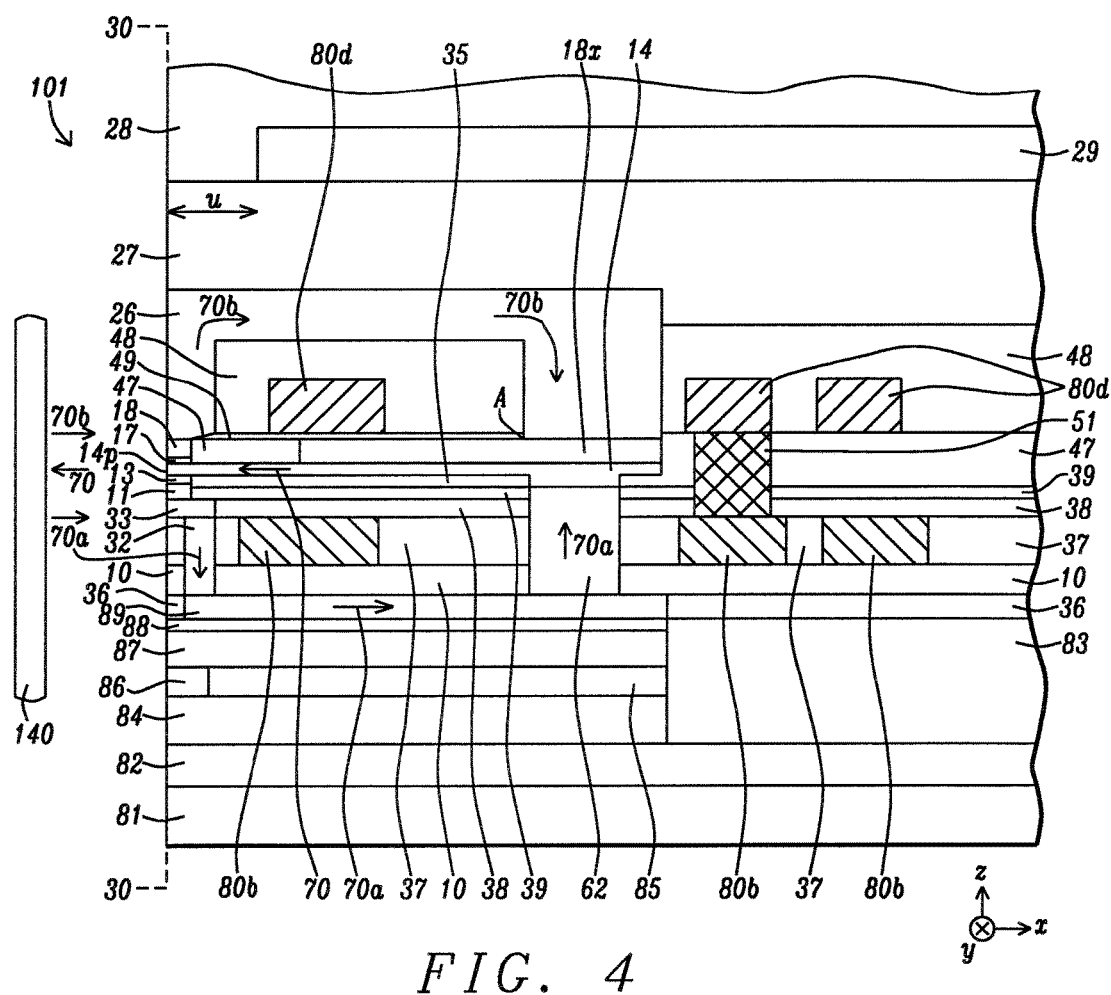
FIG. 4 is a down-track cross-sectional view of a combined read-write head with leading and trailing loop pathways for magnetic flux return to the main pole according to an embodiment of the present disclosure.

Referring to FIG. 4, magnetic recording head 101 comprises a combined read-write head. The down-track cross-sectional view is taken along a center plane (44-44 in FIG. 27A) formed orthogonal to the ABS 30-30, and that bisects the main pole layer 14. The read head is formed on a substrate 81 that may be comprised of AlTiC (alumina+TiC) with an overlying insulation layer 82 that is made of a dielectric material such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 84 is formed on insulation layer 82.

A magnetoresistive (MR) element also known as MR sensor 86 is formed on bottom shield 84 at the ABS 30-30 and typically includes a plurality of layers (not shown) including a tunnel barrier formed between a pinned layer and a free layer where the free layer has a magnetization (not shown) that rotates in the presence of an applied magnetic field to a position that is parallel or antiparallel to the pinned layer magnetization. Insulation layer 85 adjoins the backside of the MR sensor, and insulation layer 83 contacts the backsides of the bottom shield and top shield 87. The top shield is formed on the MR sensor. An insulation layer 88 and a top shield (S2B) layer 89 are sequentially formed on the top shield. Note that the S2B layer 89 may serve as a flux return path (RTP) in the write head portion of the combined read/write head. Thus, the portion of the combined read/write head structure formed below layer 89 in FIG. 4 is typically considered as the read head. In other embodiments (not shown), the read head may have a dual reader design with two MR sensors, or a multiple reader design with multiple MR sensors.

The present disclosure anticipates that various configurations of a write head may be employed with the read head portion. In the exemplary embodiment, magnetic flux 70 in main pole (MP) layer 14 is generated with flowing a current through bucking coil 80b and driving coil 80d that are below and above the MP layer, respectively, and are connected by interconnect 51. Magnetic flux 70 exits the MP layer at pole tip 14p at the ABS 30-30 and is used to write a plurality of bits on magnetic media 140. Magnetic flux 70b returns to the MP through a trailing loop comprised of trailing shields 17, 18, PP3 shield 26, and top yoke 18x. There is also a leading return loop for magnetic flux 70a that includes leading shield 11, leading shield connector (LSC) 33, S2C 32, return path 89, and back gap connection (BGC) 62. The magnetic core may also comprise a bottom yoke 35 below the MP layer. Dielectric layers 10, 11, 13, 36-39, and 47-49 are employed as insulation layers around magnetic and electrical components. A protection layer 27 covers the PP3 trailing shield and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is formed as the uppermost layer in the write head.

Figure 5A:
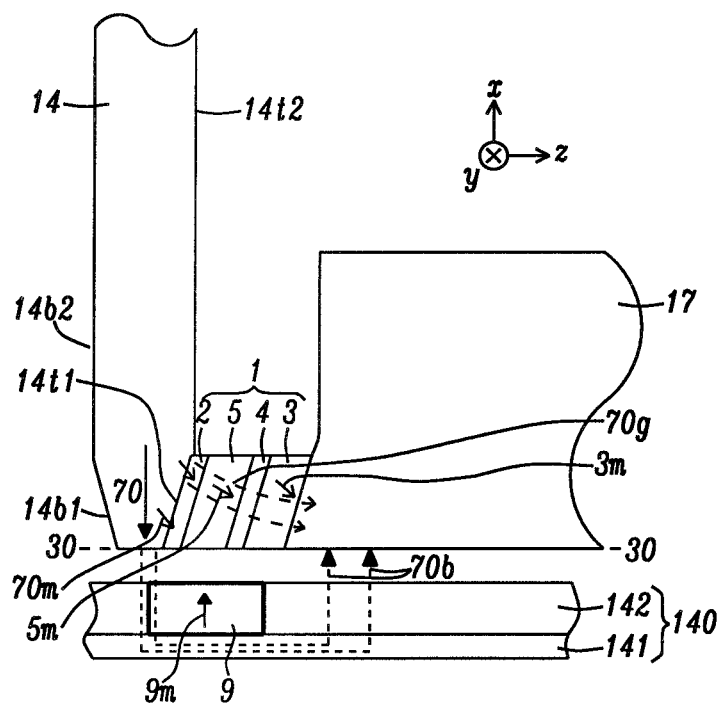
FIGS. 5A-5B and FIGS. 6A-6B show STO devices known to the inventors wherein a single SP layer is used to exert a torque to drive the FGL into a precessional state when a critical current is applied across the STO device.

Referring to FIG. 5A, a MAMR writer known to the inventors, and essentially equivalent to the writer structure in related U.S. Pat. No. 9,966,091, is depicted. There is a MP 14 with a sufficiently large local magnetic field 70 to write the media bit 9 with magnetization 9m on medium 140. Magnetic flux 70 in the MP proceeds through the ABS 30-30 and into medium bit layer 142 and soft underlayer (SUL) 141. A portion of the flux 70b is collected by trailing shield 17 and then returns to the MP through a trailing loop (shown in FIG. 4). STO 1 is at the ABS and formed on the MP tapered trailing side 14t1, which connects with a MP top surface 14t2 that is aligned orthogonal to the ABS. The MP leading side 14b1 is also tapered and connects with the MP bottom surface 14b2. Write gap field flux 70g is shown across the STO.

Figure 5B:
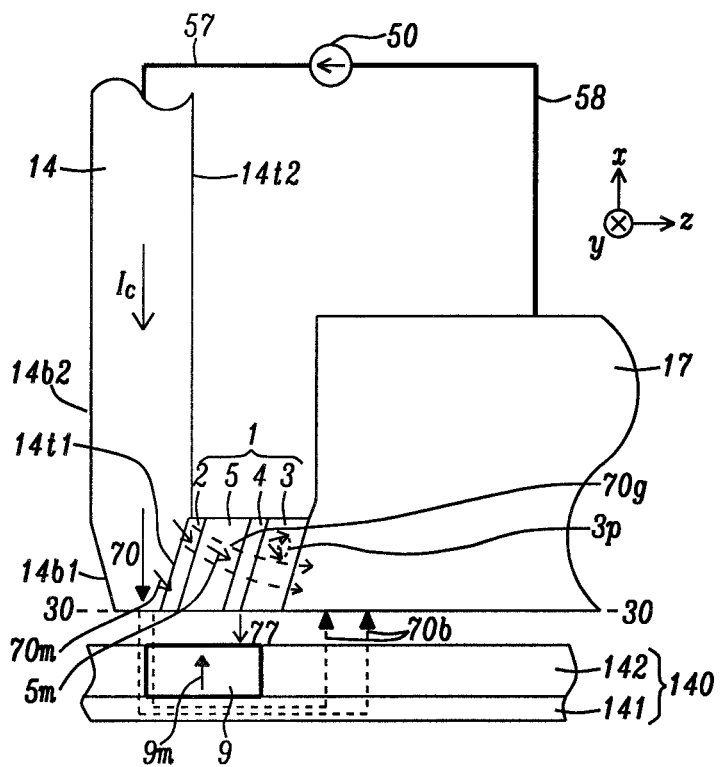

Referring to FIG. 5B, the microwave assisted magnetic recording aspect involves STO 1 with a non-magnetic (NM) spacer 2, spin polarization (SP) layer 5, NM spacer 4, and FGL 3 sequentially formed on the MP tapered trailing side 14t1. Critical current $I_c$ from a direct current (dc) source 50 is applied through lead 57 to the MP 14 and through STO 1 to TS 17 and then returns through lead 58 to the dc source. The critical current is spin polarized by the SP layer, and produces a spin torque on the FGL that drives FGL magnetization into a precessional state 3p, which in turn produces a RF field 77 on bit magnetization 9m. Bit magnetization oscillates into a precessional state (not shown) thereby reducing a coercive field of medium bit 9 so that it can be switched using a smaller MP field 70. Note that SP magnetization 5m and FGL magnetization 3m are parallel in FIG. 5A, and in the precessional state 3p, FGL magnetization remains substantially parallel to SP magnetization and to MP magnetization 70m at the MP interface with NM layer 2.

Figure 6A:
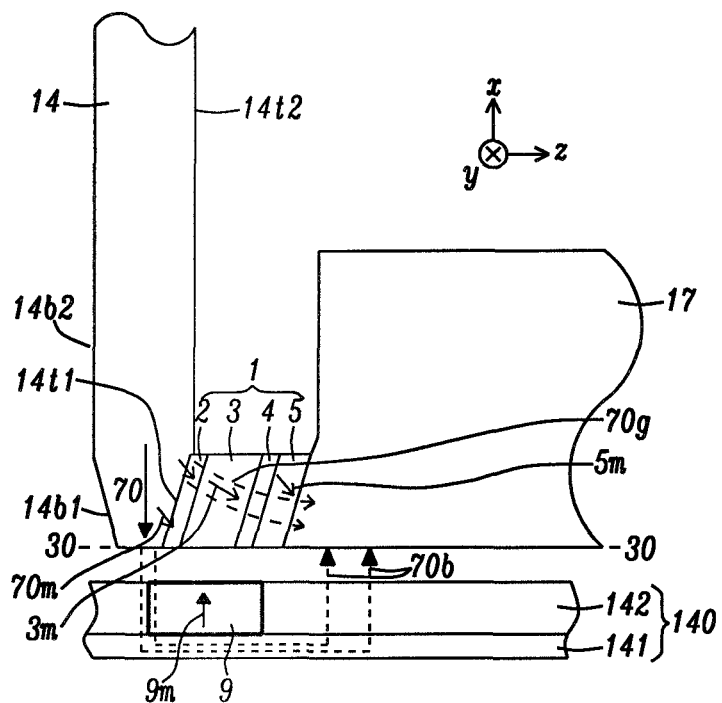

In an alternative STO configuration shown in FIG. 6A and known to the inventors, the writer structure and STO layers in FIG. 5A are retained except the positions of SP layer 5 and FGL 3 are switched so that NM spacer 2, FGL 3, NM spacer 4, and SP layer 5 are sequentially formed on the MP tapered trailing side 14t1. Again, MP magnetization 70m, FGL magnetization 3m, and SP magnetization are substantially parallel and all pointing up (toward TS 17) in the absence of a critical current between the MP and TS.

Figure 6B:
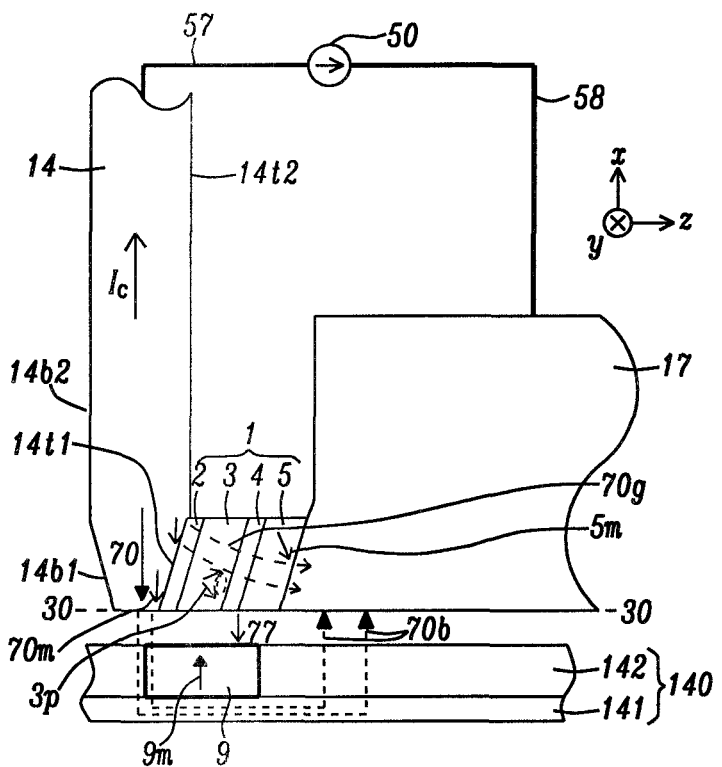

Referring to FIG. 6B, a critical current ($I_c$) is applied from TS 17 to MP 14 during a write process. As a result, the critical current is spin polarized by SP layer 5 and exerts a torque on FGL 3 to drive FGL magnetization into a precessional state 3p. A RF field 77 is generated that reduces the coercive field in magnetic bit 9 thereby allowing a smaller MP write field 70 to switch bit magnetization 9m.

In related application Ser. No. 16/037,197, we disclosed a magnetic flux guiding device involving one spin preserving (SP) layer and a FGL. In this case, the applied current ($I_a$) between the MP and FGL is sufficiently greater than such that FGL magnetization flips to an opposite direction (opposite to write gap field flux 70g) thereby increasing reluctance in the write gap and enhancing the MP field 70 at the ABS. Referring to FIG. 8C, the cone angle α for magnetization 3m in the FGL precessional state may vary from about 0 degrees up to 90 degrees depending on the magnitude of $I_a$. However, there is typically a trade off between a larger MAMR effect (as the cone angle increases) and a larger reluctance and MP field as the cone angle approaches 0 degrees.

Figure 7:
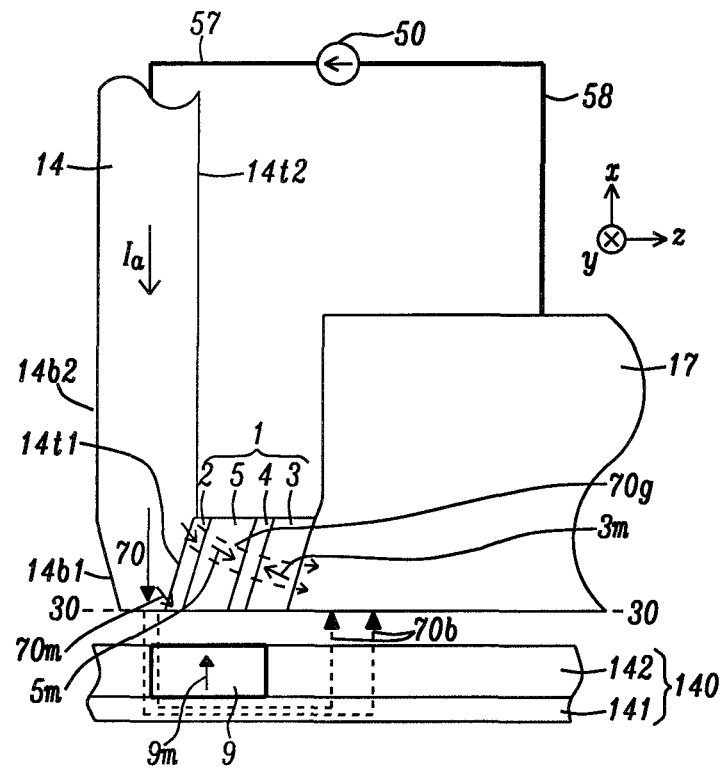
FIG. 7 shows the STO device in FIG. 5B when the applied current is sufficiently large to flip the FGL magnetization to a direction substantially opposite to the write gap field flux.

In FIG. 7, the current in FIG. 5B is increased to $I_a$ ($I_a > I_c$) according to the concept taught in related application Ser. No. 16/037,197. As a result, FGL magnetization 3m has a precessional state (FIG. 8C) and flips to a direction substantially opposite to the write gap field flux 70g. Since SP layer 5 is the only spin polarization layer, spin torque is applied to the FGL 3 from only one side. As discussed in a later section, the present disclosure discloses a new magnetic flux guiding device layout wherein spin torque may be increased at the same current ($I_a$) density or where spin torque is maintained at a certain magnitude with a lower $I_a$. Spin torque on FGL magnetization is enhanced with the insertion of a second SP layer on an opposite side of the FGL with respect to SP layer 5, and where the second SP layer has a magnetization that is anti-parallel to magnetization 5m. In related patent application HT18-021, an alternative STO design is disclosed where both of the MAMR effect and the MP field enhancement are simultaneously optimized rather than enlarging one at the expense of the other.

A key feature of some embodiments of the present disclosure is that the magnetic flux guiding device is modified to include a second SP layer in the form of an AFC SP layer having a SP1/AFC coupling/SP2 configuration on an opposite side of the FGL with respect to the first SP layer, and where SP1 contacts either the MP or TS. Thus, the magnetic flux guiding device is configured for better utilization of spin torque since SP2 and the first SP layer generate spin torque that is additive thereby requiring a lower current $I_a$ to flip FGL magnetization, or alternatively, provide a greater degree of FGL flipping for a given magnitude of $I_a$. In some embodiments, the first SP layer is replaced with a triple AFC SP stack having a TSP1/AFC1/TSP2/AFC2/TSP3 configuration wherein middle magnetic layer TSP2 is antiferromagnetically coupled to TSP3 and TSP1 (where TSP1 adjoins either the MP or TS) to enable greater SP stability compared with a single SP layer. Moreover, various embodiments are described where one or both of the single SP layer and SP1 are merged into the MP or TS, respectively, or into the TS and MP, respectively. Similarly, one or both of TSP1 and SP1 may be merged into the MP or TS, respectively, or into the TS and MP, respectively, to reduce the magnetic flux guiding device thickness. In all embodiments, the direction of $I_a$ is from the SP or triple AFC SP end of the magnetic flux guiding device towards the AFC SP end in order to generate the necessary spin torque for FGL flipping to a direction substantially opposite to the write gap field flux.

It should be understood that simply placing two SP layers on opposite sides of the FGL where both SP layers have a magnetization aligned parallel to that of the FGL in the absence of an applied current will not have the desired effect of lowering the magnitude of $I_a$ necessary to flip the FGL magnetization compared with a single SP layer. Instead, under one current polarity, $I_a$ polarized by the bottom SP destabilizes the FGL whereas $I_a$ polarized by the top SP layer stabilizes the FGL and generates a spin torque to cancel the spin torque from the bottom SP. This configuration is not workable when $I_a$ is applied from the MP to the TS, or from the TS to the MP unless materials with negative spin polarization are introduced in the magnetic flux guiding device. However, the present disclosure is directed to typical materials having positive spin polarization in the magnetic flux guiding device.

As mentioned below, a workable STO configuration is realized by introducing an AFC SP layer on an opposite side of the FGL with respect to the SP layer such that the AFC SP layer (SP2) that is closer to the FGL has a magnetization opposite to that of the SP layer. When the SP layer is replaced with a triple AFC SP layer, the TSP3 layer (closest to the FGL) has a magnetization opposite to that of the SP2 layer. Furthermore, $I_a$ must be applied from the SP or TSP3 side of the FGL layer toward the SP2 layer for FGL flipping since $I_a$ applied from the opposite direction will only stabilize FGL magnetization and prevent FGL flipping to a direction that is opposite to the write gap field flux.

Figure 8A:
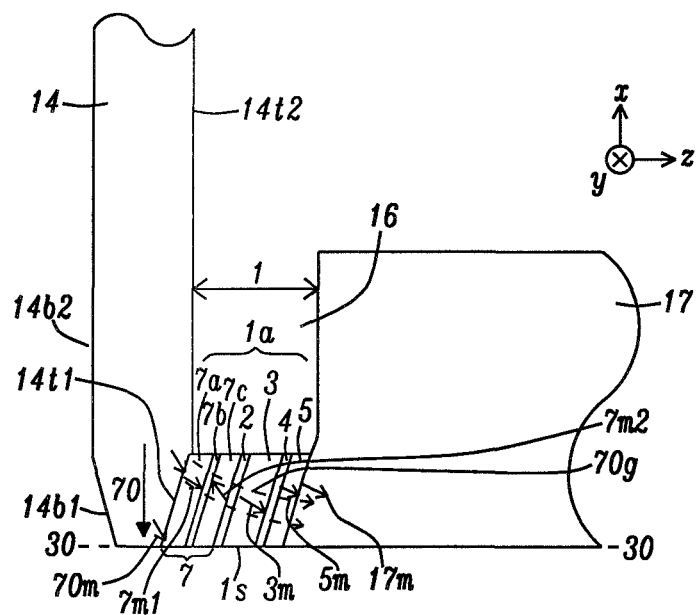

Referring to FIG. 8A, a first embodiment of the present disclosure is illustrated and comprises magnetic flux guiding device 1a having a bottom surface contacting a MP tapered trailing side 14t1 and a top surface adjoining TS 17. The MP and TS structures were described previously. Magnetic flux guiding device 1a has a front side 1s formed at the ABS in the exemplary embodiment. However, in other embodiments (not shown), the front side may be recessed from the ABS. Magnetic flux guiding device 1a retains all layers described earlier with regard to the STO in FIG. 6A, but also includes an AFC SP layer 7 wherein SP1 layer 7a with magnetization 7m1, AFC layer 7b, and SP2 layer 7c with magnetization 7m2 are sequentially formed on the MP tapered trailing side. In the absence of a dc bias current, magnetizations 7m1, 7m2 are anti-parallel to each other while MP magnetization 70m (at the MP interface 14t1 with SP1), magnetization 7m1, FGL magnetization 3m, and SP magnetization 5m are aligned substantially parallel to each other and pointing up toward TS 17 that has magnetization 17m proximate to SP 5. Here, magnetizations 70m and 7m1 are ferromagnetically (FM) coupled and magnetizations 5m and 17m are FM coupled. Write gap field flux 70g is generally in the z-axis direction from the MP to TS and across STO 1a.

Non-magnetic (NM) spacers 2 and 4 may be single layer or multilayer films as appreciated by those skilled in the art, and are preferably a non-magnetic metal with a long spin diffusion length such as Cu, Ag, or Au so that current polarized by the adjacent SP layer 5 and SP2 layer 7c does not encounter strong spin-flip scattering in the spacers. In other embodiments, one or both NM spacers may be a metal oxide layer similar to the metal oxide spacer that was disclosed in related U.S. Pat. No. 9,230,571. The spacers also prevent strong ferromagnetic coupling between magnetic layers on each side thereof.

Each of SP 5, SP1 layer 7a, SP2 layer 7b, and FGL 3 may be a single layer or alloy that is Fe, Co, Ni, CoFe, NiFe, or CoFeNi, for example, or a multilayer of one or more of the aforementioned elements and alloys. In other embodiments, one or more of the SP, SP1, SP2, and FGL layers may be a laminated stack of layers such as $(Co/Ni)_n$, $(CoFe/Ni)_n$, $(Co/NiCo)_n$, $(Co/Pt)_n$, $(Co/Pd)_n$, $(Fe/V)_n$, $(Co/X)_n$, or $(CoM/X)_n$ where n is a lamination number, M is one of Ta, Ti, W, Ru, Rh, Mg, Hf, Zr, B, or Nb, and X is one of Ru, Rh, Ir, Os, V, or Mo. AFC layer 7b is typically one of Ru, Rh, Ir, Os, V, or Mo with the appropriate thickness to provide antiferromagnetic coupling between the SP1 and SP2 layers. Magnetic flux guiding device 1a has a down-track thickness t that is preferably less than or equal to the thickness of write gap 16. Therefore, the lamination number n must be minimized if a laminate is used in the magnetic flux guiding device so the thickness thereof does not become too large to fit in the required write gap thickness.

Referring to FIG. 8B, dc current $I_a$ from source 50 is applied through lead 58 to TS 17, and then across magnetic flux guiding device 1a to MP 14 before returning to the source through lead 57. Current $I_a$ is spin polarized by each of SP2 layer 7c and SP layer 5 and has sufficient density to produce an additive (destabilizing) spin torque on FGL magnetization 3m that causes FGL magnetization to flip to a direction preferably opposite to the write gap field flux. The magnitude of $I_a$ and the cumulative spin torque exerted on the FGL determines the degree of FGL flipping. In other words, higher $I_a$ and greater spin torque result in a greater degree of flipping until FGL magnetization 3m realizes a direction essentially opposite to the write gap flux field (cone angle proximate to 0 degrees in FIG. 8C). As the degree of FGL flipping increases, there is greater reluctance in the write gap 16 that reduces write gap field flux 70g thereby enhancing write field 70 on the magnetic medium (not shown).

Referring to FIG. 8C, FGL magnetization 3m in the flipped state is not in a static state, but is typically in a dynamic state with a precession forming a cone angle α around the z-axis in the opposite direction of write gap field flux 70g. As indicated previously, when current $I_a$ increases, stronger spin torque will be applied to FGL 3 and the flipped FGL magnetization will have a smaller cone angle. When the cone angle α is 0 degrees (orthogonal to MP side 14t1 and opposite to the write gap field flux) there is a maximum assist effect to reduce the write gap field flux and enhance the MP write field 70. However, the FGL will generate essentially no RF field on the magnetic medium when a is proximate to 0 degrees.

In FIG. 9A, a second embodiment of the present disclosure is illustrated and features magnetic flux guiding device 1b wherein all layers from the previous embodiment and thickness t are retained but the stacking order is different. SP layer 5, NM layer 4, FGL 3, NM layer 2, and AFC SP layer 7 are sequentially formed on the MP tapered trailing side 14t1. Here, SP1 layer 7a with magnetization 7m1 is the uppermost magnetic flux guiding device layer and contacts TS 17 while SP2 layer 7c with magnetization 7m2 adjoins NM spacer 2. Magnetizations 70m, 5m, 3m, and 7m1 are all aligned substantially parallel to each other and point up toward TS 17 in the absence of an applied current across the magnetic flux guiding device. SP2 magnetization 7m2 is anti-parallel to SP1 magnetization 7m1.

Figure 9B:
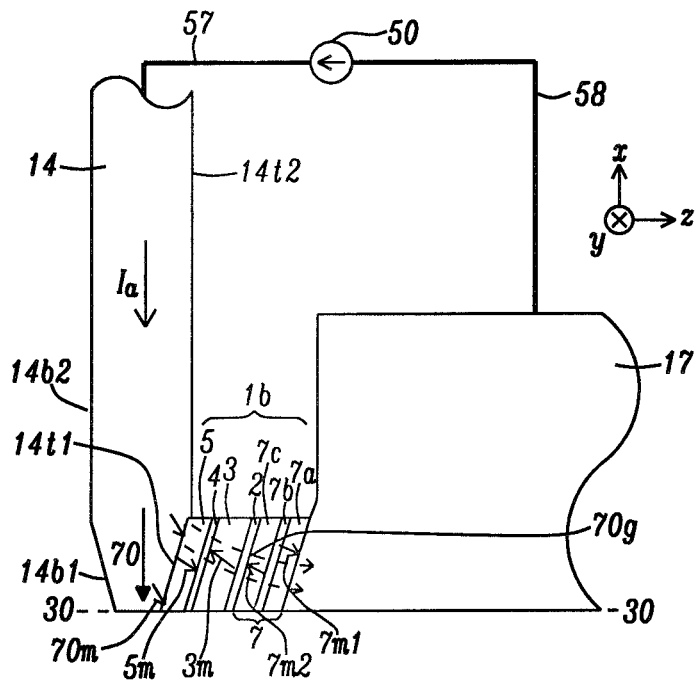

As shown in FIG. 9B, when a current $I_a$ of sufficient magnitude is applied from MP 14 across magnetic flux guiding device 1b to TS 17, $I_a$ is spin polarized by both SP2 layer 7c and SP layer 5 to generate an additive destabilizing spin torque that causes FGL magnetization 3m to flip to a direction pointing down toward MP tapered trailing side 14t1 and substantially orthogonal to said surface. As mentioned earlier, the degree of FGL flipping depends on $I_a$ magnitude and the additive spin torque from the SP and SP2 layers. Accordingly, an advantage over prior art magnetic flux guiding devices with a single SP layer is realized in that either a smaller $I_a$ is required for FGL flipping, or a greater degree of FGL flipping occurs for a given value of $I_a$.

Figure 10:
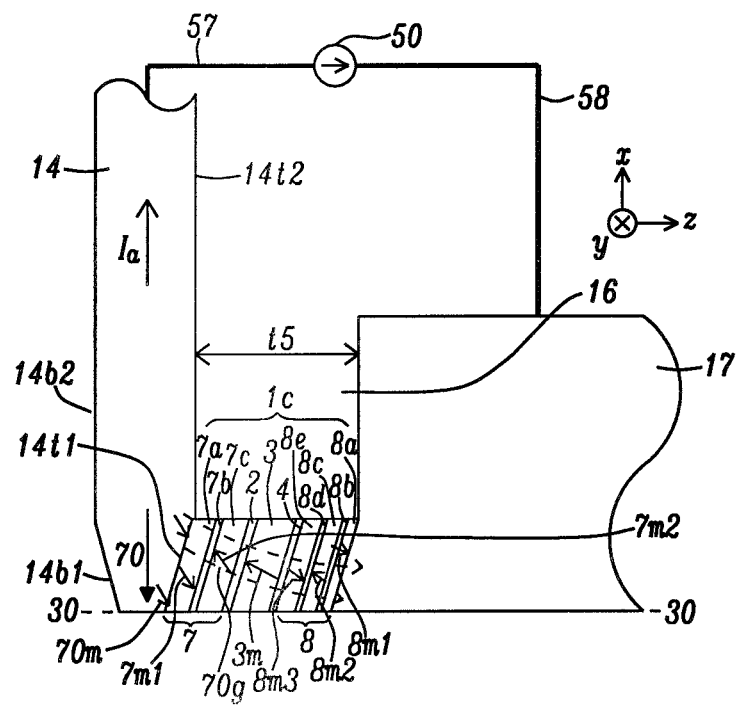
FIG. 10 shows a third embodiment of the present disclosure wherein a magnetic flux guiding device has a bottom AFC SP layer and a top trilayer AFC SP layer, and FGL magnetization flips when $I_a$ is from the TS to the MP.

Referring to FIG. 10, a third embodiment of the present disclosure is depicted as magnetic flux guiding device 1c that represents a modification of the first embodiment. In particular, the single SP layer 5 in FIG. 8B is replaced with a triple AFC SP layer 8 that has a third magnetic layer (TSP3) 8e, second AFC layer 8d, second magnetic layer (TSP2) 8c, first AFC layer 8b, and first magnetic layer (TSP1) 8a sequentially formed on NM layer 4. Thus, the uppermost layer TSP1 contacts TS 17. Moreover, magnetic flux guiding device thickness is increased to t5 because of the additional layers. When current $I_a$ is applied from TS 17 to MP 14, FGL magnetization 3m flips from a direction pointing up (not shown) to a direction substantially toward MP tapered trailing side 14t1. Here SP1 magnetization 7m1 is anti-parallel to SP2 magnetization 7m2 in AFC SP layer 7c while TSP2 magnetization 8m2 is anti-parallel to both TSP1 and TSP3 magnetizations 8m1, 8m3, respectively, in triple AFC layer 8. Note that magnetizations 8m3 and 7m2 are substantially anti-parallel to one another. As a result, spin torque exerted by the TSP3 and SP2 layers is additive on FGL 3 and destabilizes magnetization 3m to facilitate FGL flipping that reduces write gap field flux 70g, and enhances write field 70.

TSP1 8a, TSP2 8c, and TSP3 8e each have a composition that may be selected from the same materials described previously for SP1 7a and SP2 7c. Likewise, first and second AFC layers 8b, 8d, respectively, are preferably one of Ru, Rh, Ir, Os, V, or Mo to provide antiferromagnetic coupling between TSP1 and TSP2, and between TSP2 and TSP3, respectively.

Figure 11:
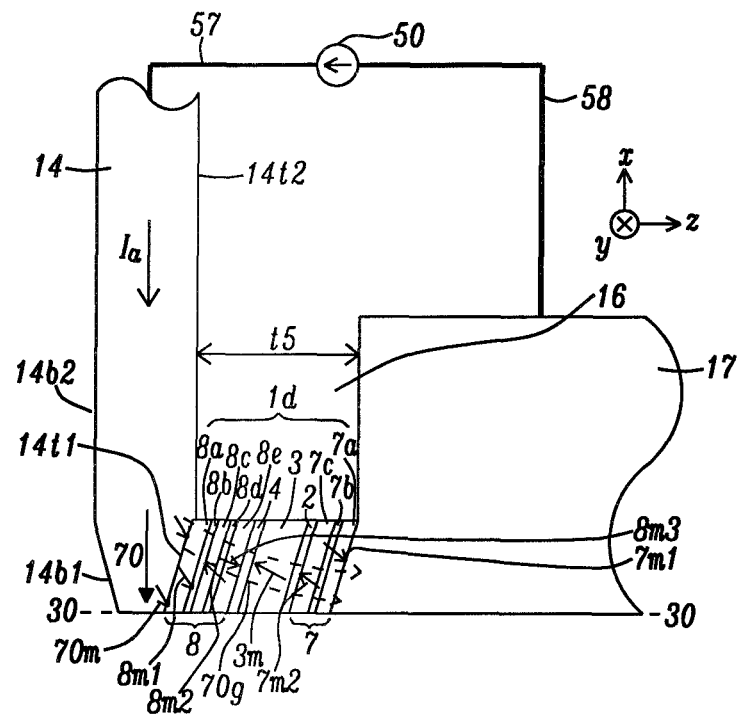
FIG. 11 shows a fourth embodiment of the present disclosure wherein a magnetic flux guiding device has a bottom trilayer AFC SP layer and a top AFC SP layer, and FGL magnetization flips when $I_a$ is from the MP to the TS.

In FIG. 11, a fourth embodiment of the present disclosure is shown as magnetic flux guiding device 1d that represents a modification of the second embodiment. The single SP layer 5 in FIG. 9B is replaced with a triple AFC SP layer 8 that retains all layers described in the third embodiment. Thus, TSP1 8a, first AFC layer 8b, TSP2 8c, second AFC layer 8d, and TSP3 8e are sequentially formed on MP tapered trailing side 14t1. In this case, the uppermost layer TSP3 contacts NM spacer 4. Magnetic flux guiding device 1d has NM spacer 4, FGL 3, NM layer 2, and AFC SP layer 7 stacked in order on the triple AFC layer, and wherein SP2 7c adjoins NM layer 2 and uppermost SP1 7a contacts TS 17. When current $I_a$ is applied from MP 14 to TS 17, FGL magnetization 3m flips from a direction pointing up (not shown) to a direction substantially pointing toward MP tapered trailing side 14t1. Antiferromagnetic coupling in AFC layer 7 stabilizes SP1 magnetization 7m1 and SP2 magnetization 7m2 while antiferromagnetic coupling between TSP1 magnetization 8m1 and TSP2 magnetization 8m2, and between magnetization 8m2 and TSP3 magnetization 8m3 stabilizes triple AFC layer 8. Since TSP3 magnetization 8m3 and SP2 magnetization 7m2 are substantially anti-parallel to one another, and on opposite sides of FGL 3, $I_a$ is spin polarized by the TPS3 and SP2 layers to create an additive destabilizing spin torque to facilitate the flipping of FGL magnetization 3m. Accordingly, reluctance is increased in the write gap to reduce write gap field flux 70g, and enhance write field 70 during a write process.

Figure 12:
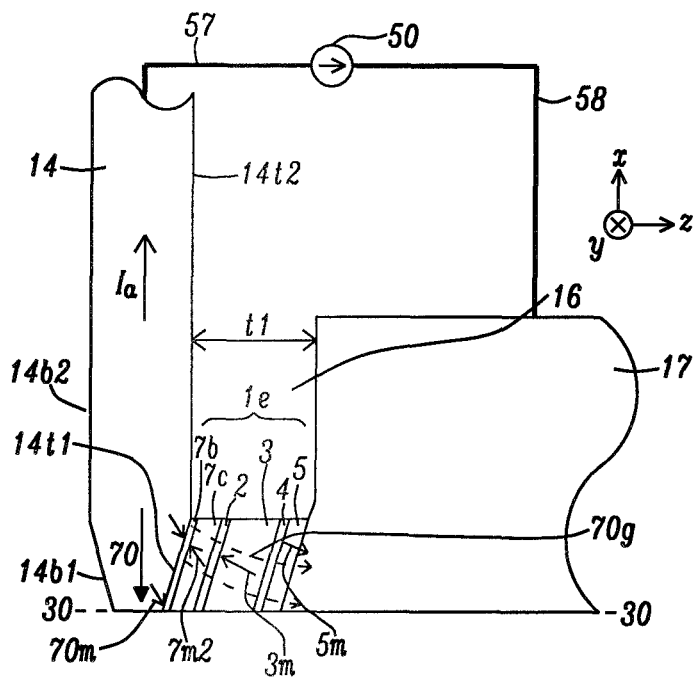
FIGS. 12-14 are fifth through seventh embodiments where one or both of the bottom SP1 sub-layer in the AFC SP and top SP layer in the first embodiment are merged into the MP or TS, respectively, to reduce a thickness of the magnetic flux guiding device.

Fifth through seventh embodiments of STO devices described herein are modifications of the first embodiment where one or both of SP layer 5 and SP1 layer 7a are merged into TS 17 or MP 14, respectively. For example, in the fifth embodiment illustrated in FIG. 12, SP1 layer 7a is merged into MP 14 to provide magnetic flux guiding device 1e having a reduced thickness t1 compared with that of magnetic flux guiding device 1a since the SP1 layer is omitted. Magnetization 70m at MP tapered trailing side is antiferromagnetically coupled through AFC layer 7b to SP2 magnetization 7m2. Therefore, a MP portion proximate to MP tapered trailing side 14t1 effectively serves as the SP1 layer to stabilize SP2 magnetization 7m2. When current $I_a$ is applied from TS 17 to MP 14, FGL magnetization 3m is flipped to a direction substantially pointing toward MP tapered trailing side. Similar to the first embodiment, SP2 magnetization 7m2 and SP magnetization 5m are substantially anti-parallel to each other and on opposite sides of FGL 3, and therefore spin polarize $I_a$ to exert an additive destabilizing spin torque on the FGL and achieve the benefit of a lower $I_a$ for FGL flipping, or a higher degree of FGL flipping at a given $I_a$ magnitude compared with a magnetic flux guiding device having only a single SP layer.

Figure 13:
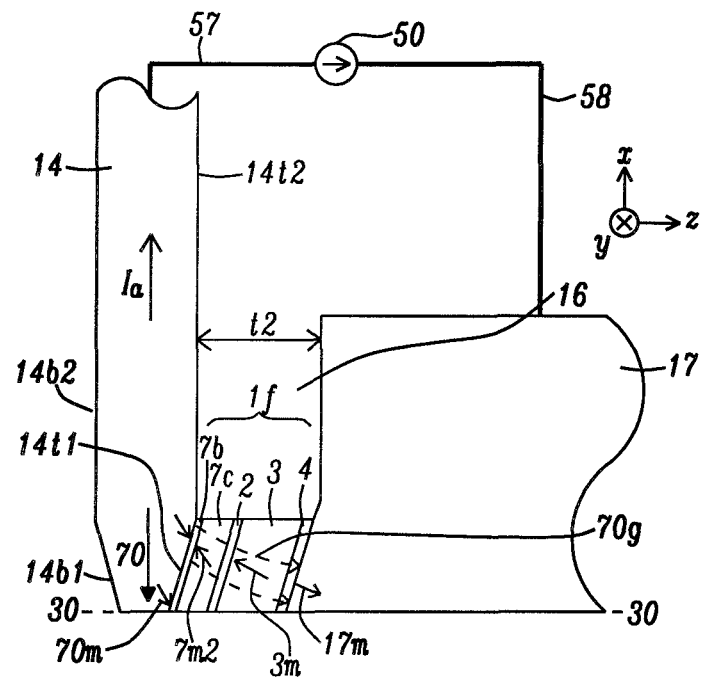

In the sixth embodiment shown in FIG. 13, magnetic flux guiding device 1e is modified with the merger of SP layer 5 into TS 17 to provide magnetic flux guiding device 1f having a thickness t2 where t2<t1. In this case, TS magnetization 17m effectively replaces SP magnetization 5m in the first embodiment and a TS portion proximate to NM spacer 4 serves as the single spin polarization (SP) layer. When current $I_a$ is applied from TS 17 to MP 14, FGL magnetization 3m is flipped to a direction substantially orthogonal to MP tapered trailing side. Since SP2 magnetization 7m2 and TS magnetization 17m are substantially anti-parallel to each other and on opposite sides of FGL 3, $I_a$ is spin polarized to exert an additive destabilizing spin torque on the FGL and achieve the benefit of a lower $I_a$ for FGL flipping, or a higher degree of FGL flipping at a given $I_a$ magnitude compared with a magnetic flux guiding device having only a single SP layer.

Figure 14:
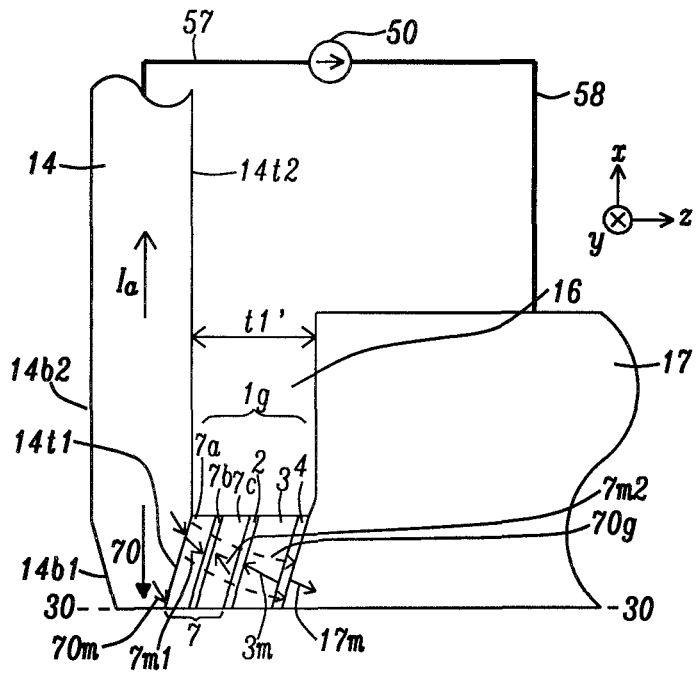

According to a seventh embodiment in FIG. 14, AFC SP layer 7 is retained from the first embodiment. However, similar to the sixth embodiment, SP layer 5 is omitted, and a TS portion having magnetization 17m proximate to NM spacer 4 effectively serves as the SP layer on an opposite side of FGL 3 with respect to the SP2 layer 7c. The combined destabilizing spin torque (not shown) exerted on FGL magnetization 3m when the TS portion with magnetization 17m and the SP2 layer 7c spin polarize Ia (from TS 17 to MP 14) causes the FGL magnetization to flip to a direction pointing toward MP tapered trailing side 14t1. The degree of FGL flipping depends on the Ia magnitude and the combined spin torque from SP2 and TS 17.

Figure 15:
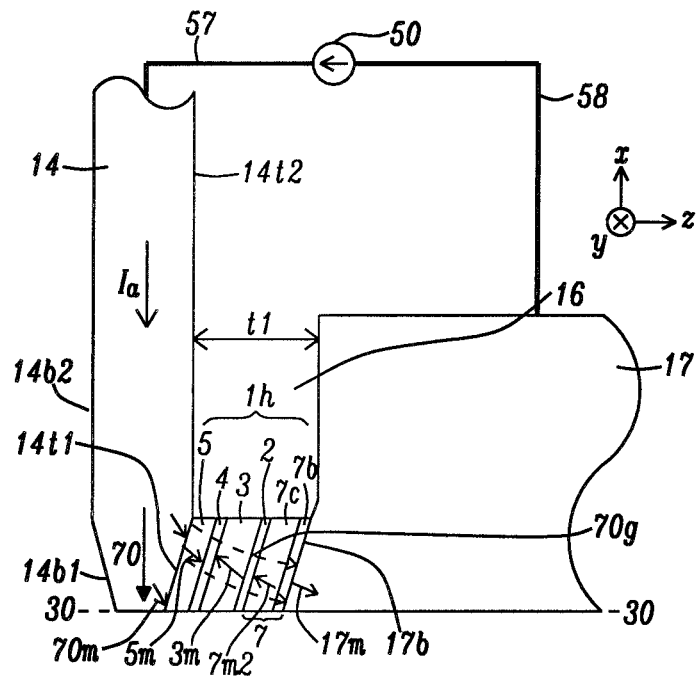
FIGS. 15-17 are eight through tenth embodiments where one or both of the top SP1 sub-layer in the AFC SP and bottom SP layer in the second embodiment are merged into the TS or MP, respectively, to reduce a thickness of the magnetic flux guiding device.

Eighth through tenth embodiments of the present disclosure are modifications of the second embodiment where one or both of SP layer 5 and SP1 layer 7a are merged into MP 14 or TS 17, respectively. According to the eighth embodiment shown in FIG. 15, SP1 layer 7a is merged into TS 17 to yield magnetic flux guiding device 1h having thickness t1<t since the SP1 layer is omitted. Magnetization 17m in a TS portion adjoining AFC layer 7b is antiferromagnetically coupled through AFC layer 7b to SP2 magnetization 7m2. The TS portion proximate to TS interface 17b effectively serves as the SP1 layer to stabilize SP2 magnetization. When current $I_a$ is applied from TS 17 to MP 14, FGL magnetization 3m is flipped to a direction substantially pointing toward MP tapered trailing side 14t1. Similar to the first embodiment, SP2 magnetization 7m2 and SP magnetization 5m are substantially anti-parallel to each other and on opposite sides of FGL 3, and therefore spin polarize $I_a$ to exert an additive destabilizing spin torque on the FGL and achieve the benefit of a lower $I_a$ for FGL flipping, or a higher degree of FGL flipping at a given $I_a$ magnitude compared with a magnetic flux guiding device having only a single SP layer.

Figure 16:
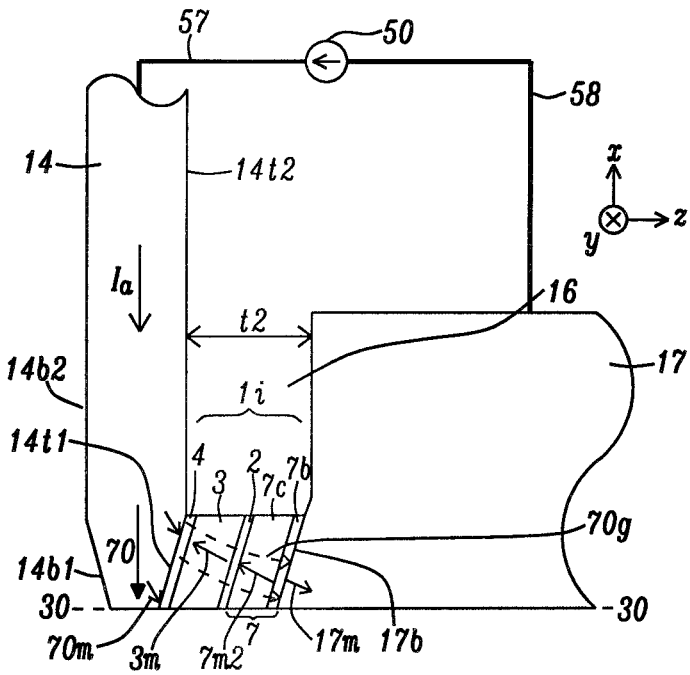

In the ninth embodiment shown in FIG. 16, the eighth embodiment is modified with the merger of SP layer 5 into MP 14 to provide magnetic flux guiding device having a thickness t2 where t2<H. MP magnetization 70m proximate to MP tapered trailing side 14t1 effectively replaces SP magnetization 5m in the second and eighth embodiments, and a portion of MP 14 proximate to NM spacer 4 serves as the single spin polarization (SP) layer. When current $I_a$ is applied from MP 14 to TS 17, FGL magnetization 3m is flipped to a direction substantially toward the MP tapered trailing side. Because SP2 magnetization 7m2 and MP magnetization 70m are substantially anti-parallel to each other and on opposite sides of FGL 3, $I_a$ is spin polarized to exert an additive destabilizing spin torque on the FGL and achieve the benefit of a lower Ia for FGL flipping, or a higher degree of FGL flipping at a given $I_a$ magnitude compared with a magnetic flux guiding device having a single SP layer.

Figure 17:
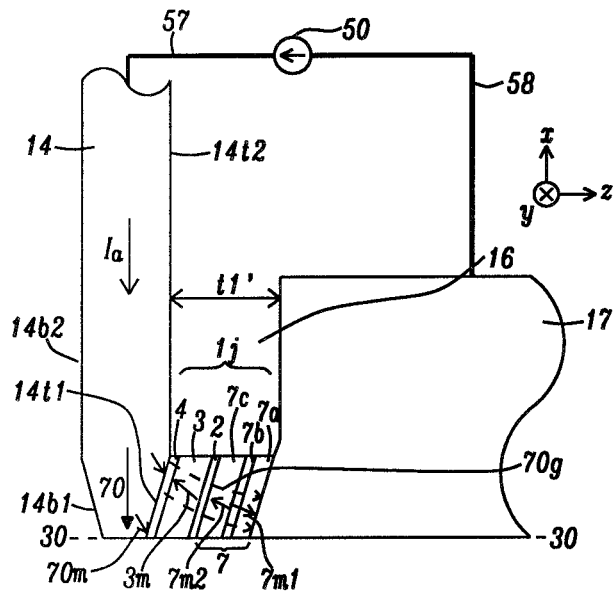

According to a tenth embodiment shown in FIG. 17, AFC SP layer 7 is retained from the second embodiment. However, similar to the ninth embodiment, SP layer 5 is omitted, and a MP portion having magnetization 70m proximate to MP tapered trailing side 14t1 effectively serves as the SP layer on an opposite side of FGL 3 with respect to the AFC SP layer. The combined destabilizing spin torque (not shown) exerted on FGL magnetization 3m when the MP portion with magnetization 70m and the SP2 layer 7c spin polarize $I_a$ (from MP 14 to TS 17) causes the FGL magnetization to flip to a direction pointing toward MP tapered trailing side 14t1. The degree of FGL flipping is related to the magnitude of $I_a$ and the combined spin torque from SP2 7c and MP 14. Magnetic flux guiding device 1j thickness is t1' and may be equal to t1 when a thickness of SP layer 5 is the same as that of SP1 layer 7a. Typically, t2<t1~t1'<t.

Figure 18:
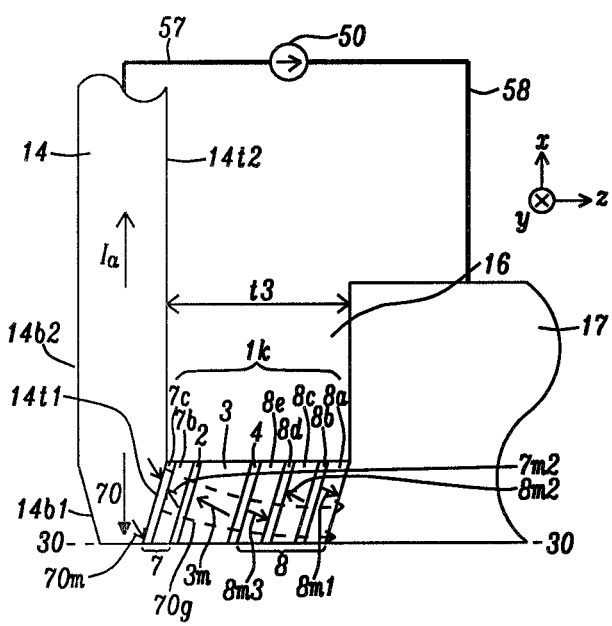
FIGS. 18-20 are eleventh through thirteenth embodiments where one or both of the top layer in the trilayer AFC SP layer and bottom SP1 sub-layer in the AFC SP in the third embodiment are merged into the TS or MP, respectively.

Eleventh through thirteenth embodiments of magnetic flux guiding devices of the present disclosure are modifications of the third embodiment where one or both of SP1 layer 7a and TSP1 layer 8a are merged into MP 14 or TS 17, respectively. For example, in the eleventh embodiment illustrated in FIG. 18, SP1 layer 7a is merged into MP 14 to provide magnetic flux guiding device 1k having a reduced thickness t3 (t3<t5) compared with that of third embodiment since the SP1 layer is omitted. Magnetization 70m at MP tapered trailing side 14t1 is antiferromagnetically coupled through AFC layer 7b to SP2 magnetization 7m2. Accordingly, a MP portion proximate to MP tapered trailing side 14t1 effectively serves as the SP1 layer to stabilize SP2 magnetization 7m2. When current $I_a$ of sufficient magnitude is applied from TS 17 to MP 14, FGL magnetization 3m is flipped to a direction substantially toward the MP tapered trailing side. Similar to the third embodiment, SP2 magnetization 7m2 and TSP3 magnetization 8m3 are substantially anti-parallel to each other and on opposite sides of FGL 3, and therefore spin polarize Ia to exert an additive destabilizing spin torque on the FGL and achieve the benefit of a lower $I_a$ for FGL flipping, or a higher degree of FGL flipping at a given $I_a$ magnitude compared with a magnetic flux generating device having only a single SP layer.

Figure 19:
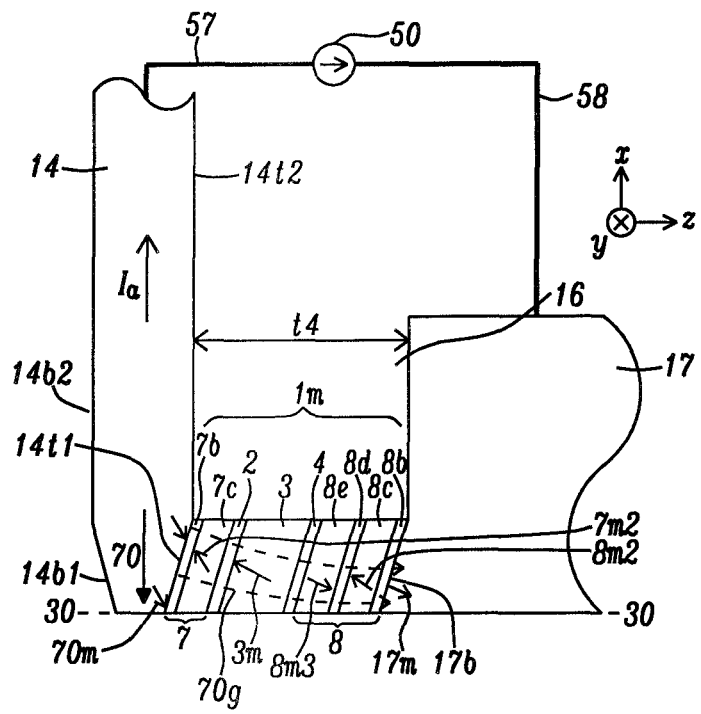

Referring to FIG. 19, a twelfth embodiment is shown where the eleventh embodiment is modified with the merger of TSP1 layer 8a into TS 17 to provide magnetic flux guiding device 1m having a thickness t4 where t4<t3 because both of the SP1 and TSP1 layers are omitted. In this case, TS magnetization 17m proximate to TS bottom surface 17b effectively replaces TSP1 magnetization 8m1 in the third embodiment. Moreover, a portion of MP 14 that adjoins AFC layer 7b serves as the SP1 layer. When current $I_a$ is applied from TS 17 to MP 14, FGL magnetization 3m is flipped to a direction substantially toward MP tapered trailing side 14t1. Since SP2 magnetization 7m2 and TSP3 magnetization 8m3 are substantially anti-parallel to each other and on opposite sides of FGL 3, $I_a$ is spin polarized to exert an additive destabilizing spin torque on the FGL and achieve the benefit of a lower $I_a$ for FGL flipping, or a higher degree of FGL flipping at a given $I_a$ magnitude compared with a magnetic flux guiding device having a single SP layer.

Figure 20:
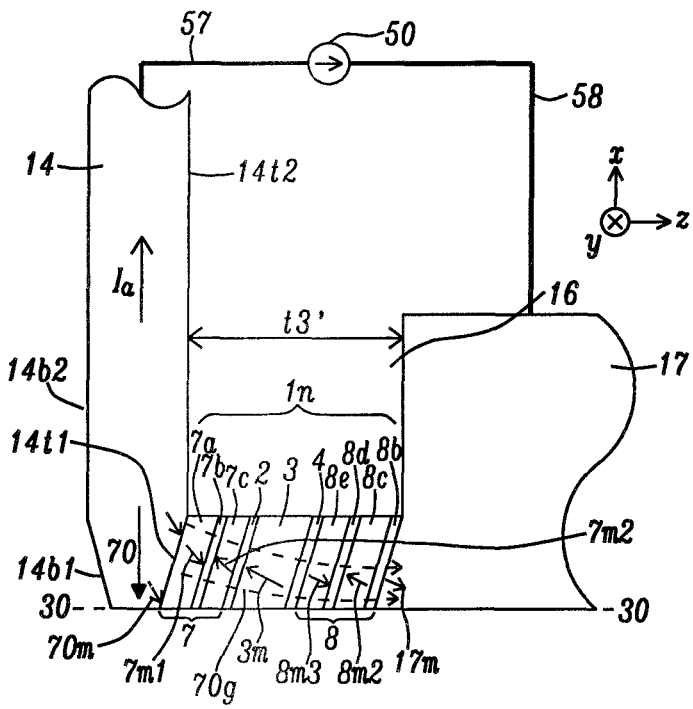

In the thirteenth embodiment depicted in FIG. 20, AFC SP layer 7 is retained from the third embodiment. However, similar to the twelfth embodiment, TSP1 layer 8a is omitted to yield magnetic flux guiding device 1n, and a TS portion having magnetization 17m proximate to TS bottom surface 17b effectively serves as the TSP1 layer. TSP3 8e is on an opposite side of FGL 3 with respect to the SP2 7c. The combined destabilizing spin torque (not shown) exerted on FGL magnetization 3m when the TSP3 and SP2 layers spin polarize $I_a$ (from TS 17 to MP 14) causes the FGL magnetization to flip to a direction pointing toward MP tapered trailing side 14t1. The degree of FGL flipping depends on the $I_a$ magnitude and the combined spin torque from the SP2 and TSP3 layers. Magnetic flux guiding device 1n thickness is t3' and may be equal to t3 when a thickness of SP1 7a is the same as that of TSP1 layer 8a. Typically, t4<t3~t3'<t5.

Figure 21:
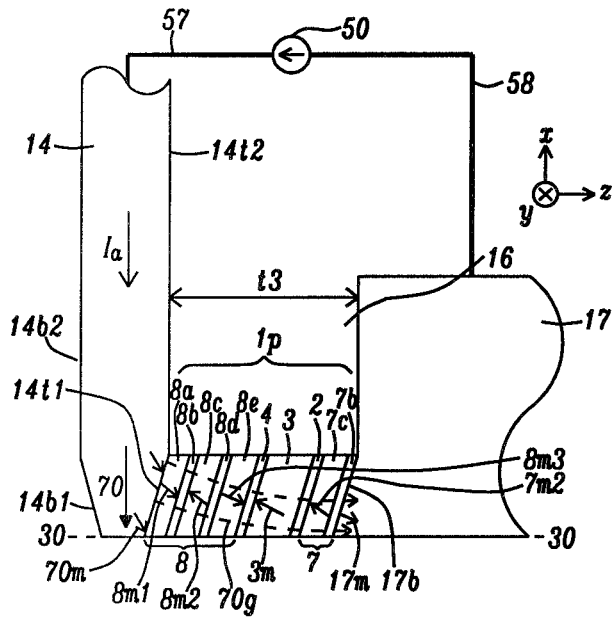
FIGS. 21-23 are fourteenth through sixteenth embodiments where one or both of the bottom layer in the trilayer AFC SP layer and top SP1 sub-layer in the AFC SP in the fourth embodiment are merged into the MP or TS, respectively.

Fourteenth through sixteenth embodiments of the present disclosure are modifications of the fourth embodiment where one or both of TSP1 layer 8a and SP1 layer 7a are merged into MP 14 or TS 17, respectively. According to the fourteenth embodiment shown in FIG. 21, SP1 layer 7a is merged into TS 17 to yield magnetic flux guiding device 1p having thickness t3<t5 since the SP1 layer is omitted. Magnetization 17m in a TS portion adjoining AFC layer 7b is antiferromagnetically coupled through AFC layer 7b to SP2 magnetization 7m2. The TS portion proximate to TS interface 17b effectively serves as the SP1 layer to stabilize SP2 magnetization. When current $I_a$ of sufficient magnitude is applied from MP 14 to TS 17, FGL magnetization 3m is flipped to a direction substantially toward MP tapered trailing side 14t1. SP2 magnetization 7m2 and TSP3 magnetization 8m3 are substantially anti-parallel to each other and on opposite sides of FGL 3. Thus, SP2 7c and TSP3 8e spin polarize $I_a$ to exert an additive destabilizing spin torque on the FGL and achieve the benefit of a lower $I_a$ for FGL flipping, or a higher degree of FGL flipping at a given $I_a$ magnitude compared with a magnetic flux guiding device having only a single SP layer.

Figure 22:
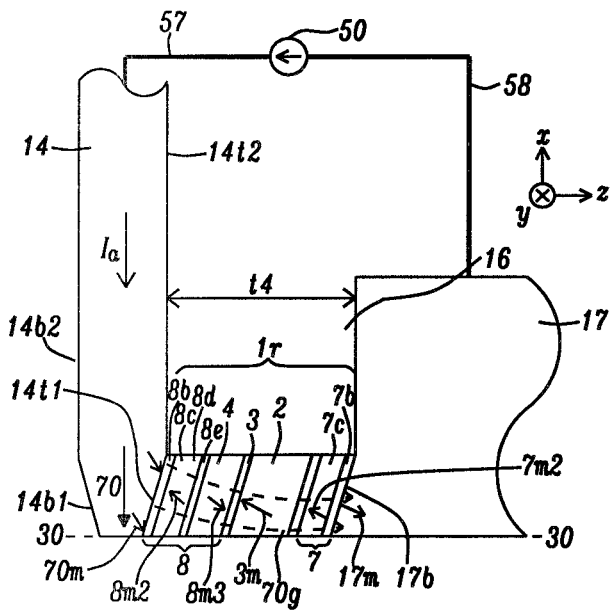

In the fifteenth embodiment shown in FIG. 22, the fourteenth embodiment is modified with the merger of TSP1 layer 8a into MP 14 to provide magnetic flux guiding device 1r having a thickness t4. MP magnetization 70m proximate to MP tapered trailing side 14t1 effectively replaces TSP1 magnetization 8m1 in the fourth embodiment and a portion of MP 14 proximate to AFC layer 8d serves as the TSP1 layer. When current $I_a$ of sufficient magnitude is applied from MP 14 to TS 17, FGL magnetization 3m is flipped to a direction substantially toward the MP tapered trailing side. Again, SP2 magnetization 7m2 and TSP3 magnetization 8m3 are substantially anti-parallel to each other and on opposite sides of FGL 3. Therefore, $I_a$ is spin polarized by SP2 7c and TSP3 8e to exert an additive destabilizing spin torque on the FGL and achieve the benefits mentioned in earlier embodiments.

Figure 23:
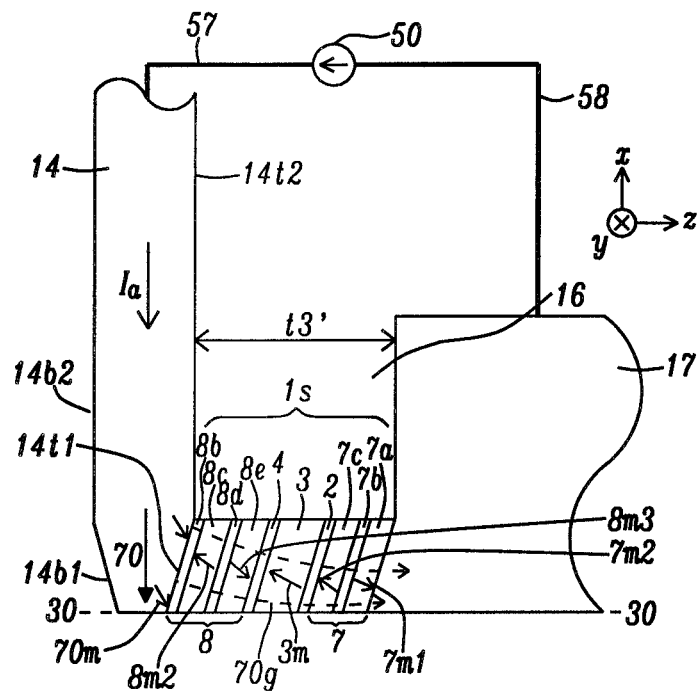

According to a sixteenth embodiment shown in FIG. 23, AFC SP layer 7 is retained from the fourth embodiment. However, similar to the fifteenth embodiment, TSP1 layer 8a is omitted, and a MP portion having magnetization 70m proximate to MP tapered trailing side 14t1 effectively serves as the TSP1 layer. The combined destabilizing spin torque (not shown) exerted on FGL magnetization 3m when TSP3 8e and SP2 7c spin polarize $I_a$ (from MP 14 to TS 17) causes the FGL magnetization to flip to a direction pointing toward MP tapered trailing side 14t1 and achieve the benefits mentioned in earlier embodiments.

The present disclosure also anticipates additional antiferromagnetic coupling schemes (not shown) beyond those described in the sixteen embodiments. For example, an AFC SP layer may be expanded to a quadruple AFC SP layer wherein four SP layers are laminated with three AFC coupling layers such that the SP layer closest to the FGL has a magnetization opposite to the SP or nearest triple SP layer on the opposite side of the FGL. Moreover, the quadruple SP layer farthest from the FGL is typically ferromagnetically coupled to a MP magnetization at the MP tapered trailing side, or to a portion of the trailing shield at a top surface of the STO device. In other embodiments, a quadruple SP layer farthest from the FGL may be merged into the MP or into the first TS layer to reduce STO device thickness. Note that a quadruple AFC SP scheme may only be feasible in writer designs where the write gap is thick enough to accommodate a greater STO device thickness.

For all embodiments, the advantage of more efficient FGL flipping at a fixed current density is associated with a greater write field 70 during writing, and therefore improved bit error rate (BER) and area density capability (ADC) performance. On the other hand, the advantage of a reduced $I_a$ to achieve the same extent of FGL flipping will also reduce power consumption and improve magnetic flux guiding device reliability since a lower current density will cause less electromigration in metal spacers and reduce the risk of other breakdown mechanisms.

Figure 24:
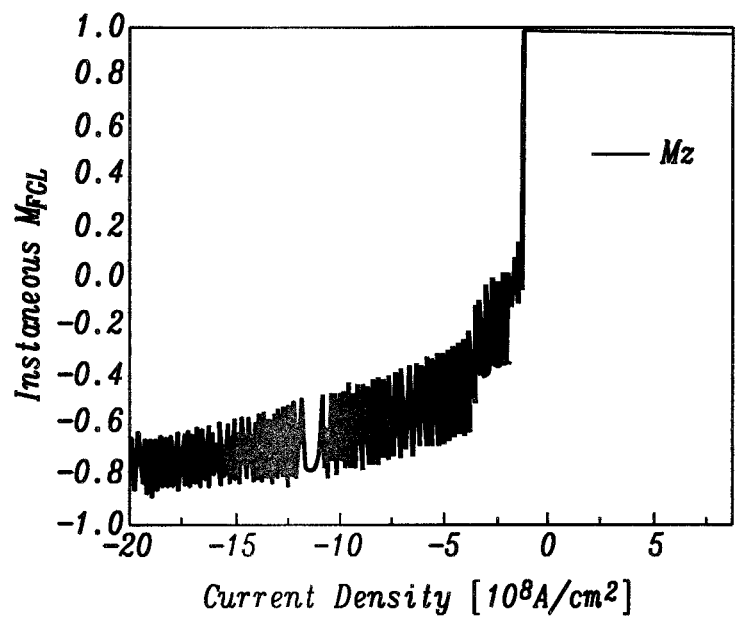
FIG. 24 is a plot of real time simulation of FGL dynamics that shows FGL magnetization as a function of current density.

FIG. 24 plots an example of the real time simulation of FGL dynamics by scanning the current density from $+1 \times 10^9$ Amps/cm$^2$ to $-2 \times 10^9$ Amps/cm$^2$ for 120 ns and where positive current direction is defined as electrons flowing from the TS to MP. Mz refers to the FGL magnetization (moment) in the down-track (z-axis) direction. FGL magnetization remains stable under positive and zero current in the write gap (WG) field flux direction. Once the current density passes approximately $-2 \times 10^8$ Amps/cm$^2$, FGL magnetization starts to flip and is driven into dynamics around the axis opposite to the WG field flux. As the negative current density increases, the dynamics cone angle becomes smaller, and FGL magnetization is more aligned to the z-axis direction opposite to the WG field flux.

Figure 25:
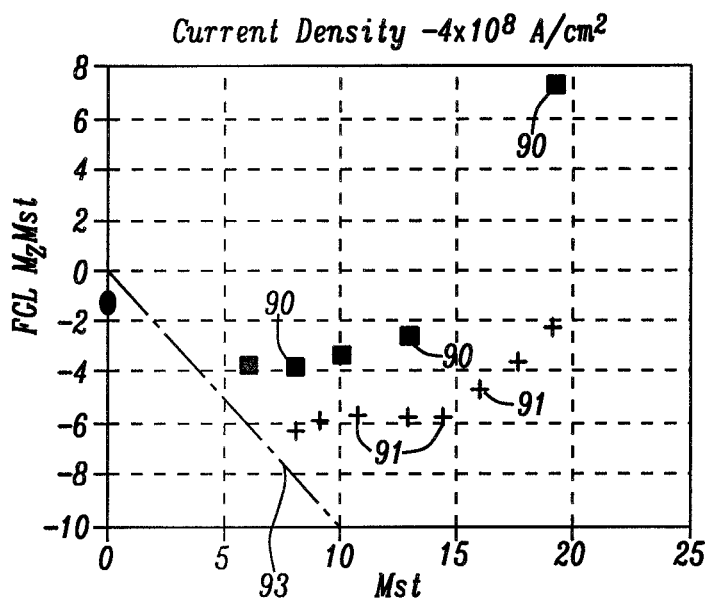
FIGS. 25-27 are plots of the effective flipped FGL magnetization saturation (Mst) vs. the actual FGL Mst for various current densities for a prior art STO device, and a magnetic flux guiding device according to the first embodiment described herein.
Figure 26:
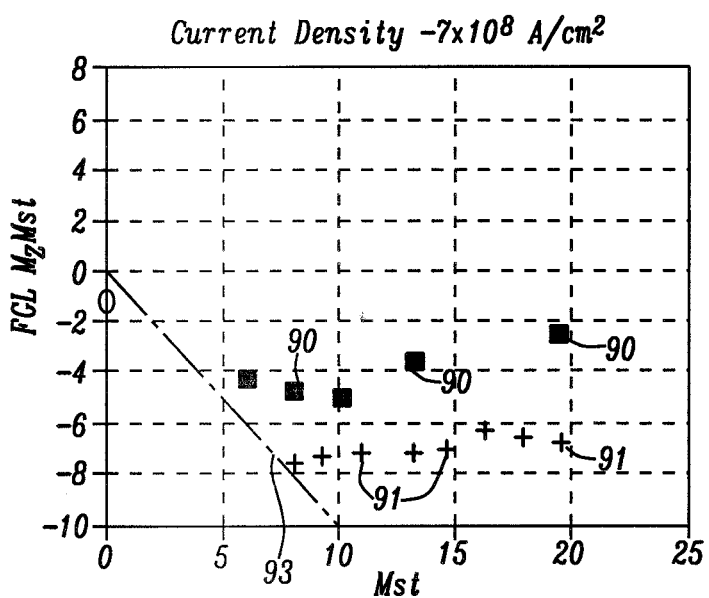
Figure 27:
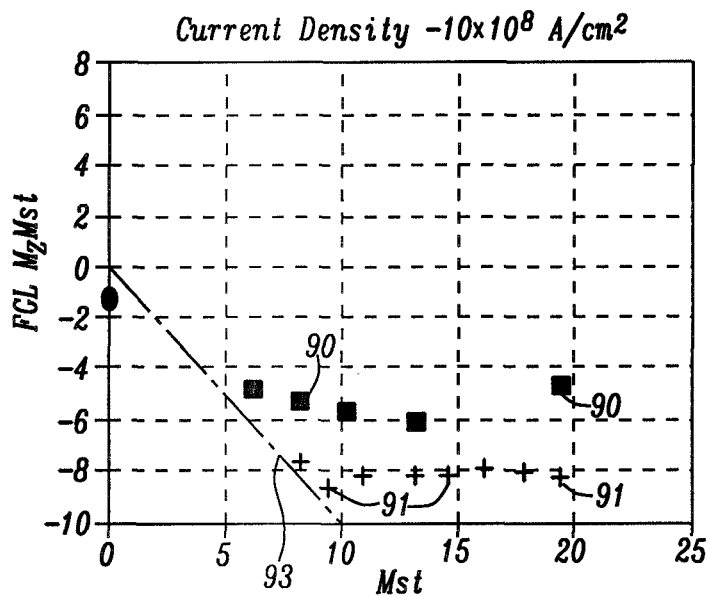

Referring to FIG. 25, the effective flipped FGL Mst (magnetization saturation×thickness), which is approximately proportional to the additional feedback field from the flipped FGL vs. the actual FGL Mst, is plotted for a current density of $-4 \times 10^8$ Amps/cm$^2$. Points 90 show the results for a magnetic flux guiding device (reference) with only one SP layer that was described previously (FIG. 7). Points 91 are results for magnetic flux guiding device 1a (FIGS. 9A-9B) formed according to an embodiment of the present disclosure. The dashed line 93 at the lower left corner is the flipping boundary where 100% FGL flipping is achieved. With larger Mst, FGL flipping is smaller but the feedback field per unit flipping is larger. FIG. 26 and FIG. 27 show similar plots where the current density is increased to $-7 \times 10^8$ Amps/cm$^2$ and $-10 \times 10^8$ Amps/cm$^2$, respectively. We find that there is an optimal FGL Mst for flipping at each current density. In all examples (FIGS. 25-27), magnetic flux guiding device 1a clearly shows better FGL flipping than the reference in FIG. 7.

Figure 28A:
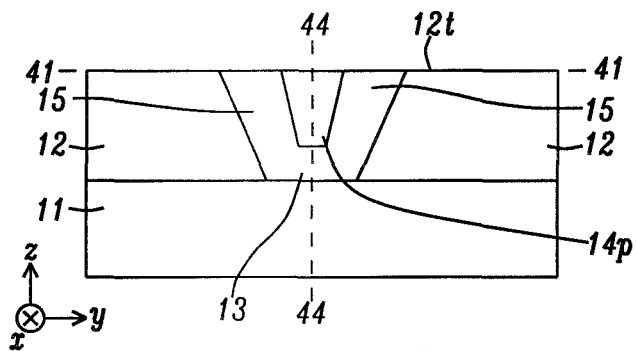
FIG. 28A and FIG. 28B show an ABS view and down-track cross-sectional view, respectively, of a first step in the process of forming a magnetic flux guiding device of the present disclosure where a tapered trailing side is formed on the main pole.
Figure 28B:
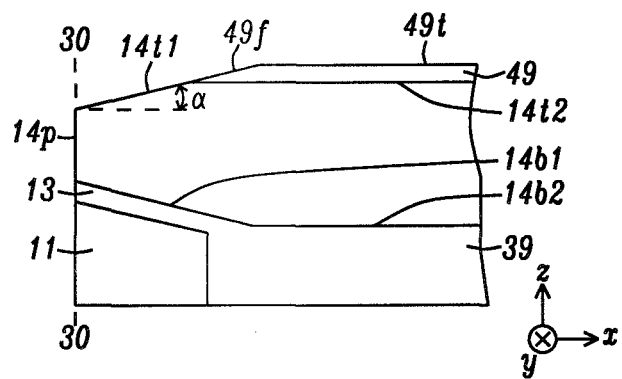

The present disclosure also encompasses a process sequence for fabricating a magnetic flux guiding device according to an embodiment described herein and is provided in FIG. 28A through FIG. 33. The partially formed writer structure including MP tip 14p that adjoins side gaps 15 and leading gap 13 in FIG. 28A is provided according to a conventional process sequence. Side shield top surfaces 12t are coplanar with a trailing edge of the MP tapered trailing side 14t1 at plane 41-41, which is orthogonal to the subsequently formed ABS plane. FIG. 28B shows the down-track cross-sectional view at plane 44-44 in FIG. 28A. MP tapered trailing side 14t1 has a taper angle α and is coplanar with a tapered front side 49f of dielectric layer 49 made of Al$_2$O$_3$ or SiO$_2$ that is formed on MP top surface 14t2. Note that the eventual ABS, hereafter referred to as ABS plane 30-30, is not determined until a lapping process is performed after all layers in the writer structure are formed.

Figure 29:
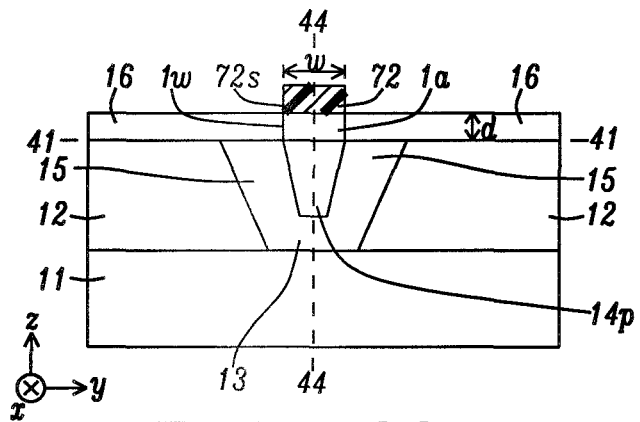
FIG. 29 shows an ABS view of the writer structure in FIG. 28A after a magnetic flux guiding stack of layers is deposited and is patterned to establish a cross-track width for the magnetic flux guiding stack layers, and then a write gap is deposited that adjoins the sides thereof.

In FIG. 29, a magnetic flux guiding stack of layers (not shown) described previously with regard to the first embodiment is deposited on the MP tapered trailing side 14t1 and on dielectric layer 49. The stack of layers is preferably conformal to the underlying topography and has a uniform thickness. Next, a first photoresist layer is coated on the magnetic flux guiding stack of layers, and is patternwise exposed and developed to provide a photoresist mask 72 having sides 72s and a cross-track width w that is bisected by plane 44-44. The photoresist mask pattern is etch transferred through the magnetic flux guiding stack of layers using a RIE process, for example, thereby forming magnetic flux guiding device 1a with sides 1w separated by width w. In some embodiments, the RIE process may simultaneously generate a backside on device 1a. Thereafter, write gap layer 16 with thickness d is deposited on the side shields 12 and side gaps 15.

Figure 30:
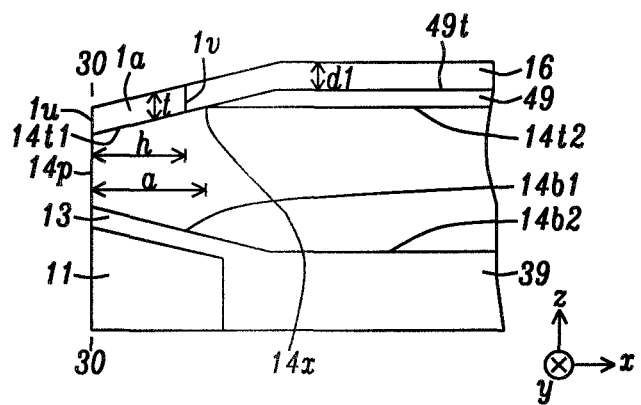
FIG. 30 is a down-track cross-sectional view of the writer structure in FIG. 29 after a second patterning step is used to form a backside on the magnetic flux guiding device and a write gap is deposited behind the device.

Referring to FIG. 30, a down-track cross-sectional view at plane 44-44 is depicted for the partially formed writer structure after photoresist mask 72 is removed by a conventional method. Magnetic flux guiding device 1a has a front side 1u at the ABS plane 30-30, a backside 1v at height h from the ABS plane, and a thickness t. In some embodiments, write gap 16 behind the magnetic flux guiding device has thickness d1 that may be essentially equal to t. Typically, h is a lesser distance from the ABS plane than height a of edge 14x where the MP tapered trailing side joins MP top surface 14t2.

Figure 31:
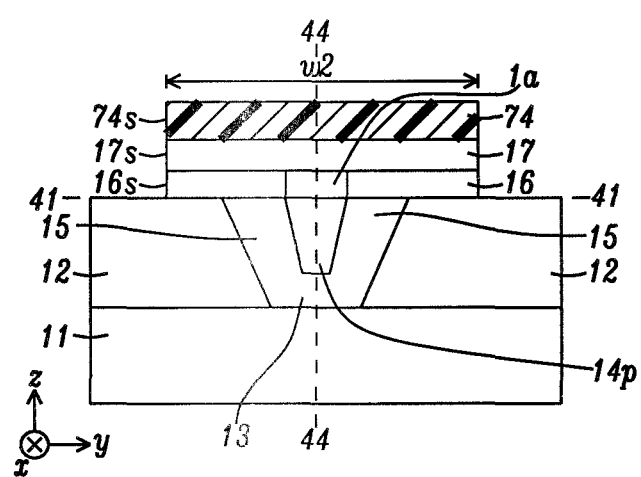
FIG. 31 is an ABS view of the writer in FIG. 30 after a first TS layer is deposited on the magnetic flux guiding device and write gap, and the write gap and first TS layer are patterned to form a cross-track width and uncovers portions of the side shield top surface.

Referring to FIG. 31, the first TS layer 17 is deposited on magnetic flux guiding device 1a and on write gap 16, and on side shield top surface 12t. Thereafter, a second photoresist layer is coated on first TS layer 17 and patterned to form photoresist mask 74 having sides 74s and a width w2 where w2>w. A second RIE or an ion beam etch (IBE) is employed to transfer the photoresist mask pattern through exposed portions of the first TS layer and write gap, and stops on side shield top surface 12t at plane 41-41 thereby generating first TS layer side 17s and write gap side 16s on each side of plane 44-44.

Figure 32:
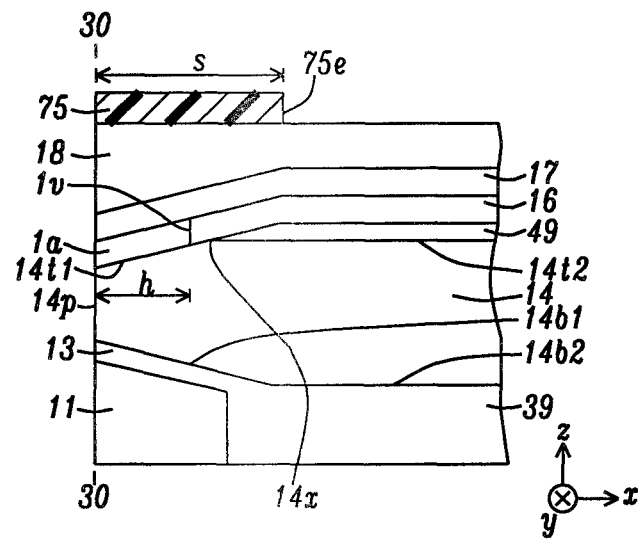
FIGS. 32-33 are down-track cross-sectional views depicting a patterning and etching process, respectively, to establish a backside on each of the first TS layer and the overlying second TS layer according to an embodiment described herein.

Referring to FIG. 32, photoresist mask 74 is removed. Then the second TS layer 18 is deposited on first TS layer 17 and on side shields 12. A third photoresist layer is coated and patterned on the second TS layer to provide photoresist mask 75 having a backside 75e at height s from the ABS plane 30-30 where s is generally larger than height a of MP edge 14x described earlier.

Figure 33:
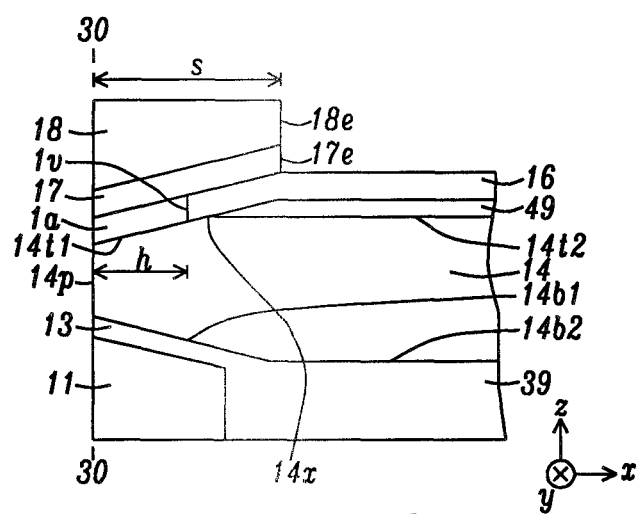

FIG. 33 depicts the partially formed writer structure in FIG. 32 after a third RIE or IBE step is performed to transfer the photoresist mask pattern through exposed regions of the first TS layer 17 and second TS layer 18, and stops at write gap top surface 16t thereby forming first TS layer backside 17e and second TS layer backside 18e at height s from the ABS plane 30-30. Thereafter, a conventional process flow is followed to complete the writer structure. According to one embodiment, a combined read-write head 101 shown in FIG. 4 is formed.

While the present disclosure has been particularly shown and described with reference to, the preferred embodiment thereof, it will be understood by those skilled in the art that various changes in form and details may be made without departing from the spirit and scope of this disclosure.

We claim:

1. A spin transfer torque (STT) assisted magnetic recording structure, comprising:
   (a) a main pole (MP) that is configured to generate a magnetic (write) field which is directed through a pole tip at an air bearing surface (ABS), and to generate a write gap (WG) field flux in a down-track direction across the WG and a magnetic flux guiding device into a trailing shield;
   (b) the trailing shield (TS) with a side at the ABS, and a bottom surface facing the MP; and
   (c) the magnetic flux guiding device having an uppermost surface contacting the TS bottom surface, and a bottommost surface adjoining a MP trailing side, comprising:
      (1) a field generation layer (FGL) with a magnetization pointing toward the TS and having an upper surface contacting a first non-magnetic spacer (NM1), and a lower surface contacting a second non-magnetic spacer (NM2);
      (2) a first spin polarization (SP) layer that adjoins NM1 and has a first magnetization substantially in a down-track direction toward the TS; and
      (3) a second SP layer that adjoins NM2 and has a second magnetization aligned opposite to the first magnetization, and wherein the magnetic flux guiding device is configured so that when a direct current ($I_a$) of sufficient magnitude is applied from the TS to MP across the magnetic flux guiding device, the first and second SP layers exert an additive destabilizing spin torque on the FGL to cause the FGL magnetization to flip to a direction substantially anti-parallel to the WG field flux thereby increasing reluctance in the write gap, which enhances the write field.

2. The STT assisted magnetic recording structure of claim 1 wherein the second SP layer is a SP2 layer in an antiferromagnetically coupled (AFC) SP configuration wherein a first magnetic (SP1) layer, a middle AFC layer, and second magnetic (SP2) layer are sequentially formed on the MP trailing side.

3. The STT assisted magnetic recording structure of claim 2 wherein the first SP layer is a single magnetic layer having a top surface that is the uppermost surface contacting the TS bottom surface.

4. The STT assisted magnetic recording structure of claim 2 wherein the first SP layer is a bottommost (TSP3) layer in a triple AFC SP configuration wherein the TSP3 layer, second AFC coupling layer, second magnetic (TSP2) layer, first AFC coupling layer, and first magnetic (TSP1) layer are sequentially formed on NM1, and the TSP1 layer has a top surface that is the uppermost surface contacting the TS bottom surface.

5. The STT assisted magnetic recording structure of claim 2 wherein the first SP layer is a bottommost (TSP3) layer in a triple AFC SP configuration wherein the TSP3 layer, a second AFC coupling layer, a second magnetic (TSP2) layer, and a first AFC coupling layer are sequentially formed on NM1, and a TS portion at the STO uppermost surface has a third magnetization parallel to the first magnetization, and the second AFC coupling layer has a top surface that is the uppermost surface contacting the TS bottom surface.

6. The STT assisted magnetic recording structure of claim 1 wherein the second SP layer is a SP2 layer in an AFC SP configuration wherein a MP portion at the MP trailing side has a third magnetization that is antiferromagnetically coupled to the second magnetization, and an AFC coupling layer and the SP2 layer are sequentially formed on the MP trailing side.

7. The STT assisted magnetic recording structure of claim 6 wherein the first SP layer is a single magnetic layer.

8. The STT assisted magnetic recording structure of claim 6 wherein the first SP layer is a bottommost (TSP3) layer in a triple AFC SP configuration wherein the TSP3 layer, second AFC coupling layer, second magnetic (TSP2) layer, first AFC coupling layer, and first magnetic (TSP1) layer are sequentially formed on NM1, and the TSP1 layer has a top surface that is the uppermost surface contacting the TS bottom surface.

9. The STT assisted magnetic recording structure of claim 6 wherein the first SP layer is a bottommost (TSP3) layer in a triple AFC SP configuration wherein the TSP3 layer, a second AFC coupling layer, a second magnetic (TSP2) layer, and a first AFC coupling layer are sequentially formed on NM1, and a TS portion at the STO uppermost surface has a third magnetization parallel to the first magnetization, and the second AFC coupling layer has a top surface that is the uppermost surface contacting the TS bottom surface.

10. The STT assisted magnetic recording structure of claim 1 wherein one or more of the first SP layer, second SP layer, and FGL are a single layer or alloy that is Fe, Co, Ni, CoFe, NiFe, or CoFeNi, or a multilayer of one or more of the aforementioned elements and alloys.

11. The STT assisted magnetic recording structure of claim 1 wherein one or both of NM1 and NM2 are one of Cu, Ag, Au, or a metal oxide.

12. A head gimbal assembly (HGA), comprising:
   (a) a slider on which the STT assisted magnetic recording structure of claim 1 is formed; and (b) a suspension that has a flexure to which the slider is joined, a load beam with one end connected to the flexure, and a base plate connected to the other end of the load beam.

13. A magnetic recording apparatus, comprising:
   (a) the HGA of claim 12;
   (b) a magnetic recording medium positioned opposite to the slider;
   (c) a spindle motor that rotates and drives the magnetic recording medium; and
   (d) a device that supports the slider, and that positions the slider relative to the magnetic recording medium.

14. A spin transfer torque (STT) assisted magnetic recording structure, comprising:
   (a) a main pole (MP) that is configured to generate a magnetic (write) field which is directed through a pole tip at an air bearing surface (ABS), and generates a write gap (WG) field flux in a down-track direction across the WG and a magnetic flux guiding device into a trailing shield;
   (b) the trailing shield (TS) with a side at the ABS, and a bottom surface facing the MP; and
   (c) the magnetic flux guiding device having an uppermost surface contacting the TS bottom surface, and a bottommost surface adjoining a MP trailing side, comprising:
      (1) a field generation layer (FGL) with a magnetization pointing toward the TS and having an upper surface contacting a first non-magnetic spacer (NM1), and a lower surface contacting a second non-magnetic spacer (NM2);
      (2) a first spin polarization (SP) layer that adjoins NM1 and has a first magnetization substantially in a down-track direction toward the MP; and
      (3) a second SP layer that adjoins NM2 and has a second magnetization aligned opposite to the first magnetization, and wherein the magnetic flux guiding device is configured so that when a direct current ($I_a$) of sufficient magnitude is applied from the MP to TS across the magnetic flux guiding device, the first and second SP layers exert an additive destabilizing spin torque on the FGL to cause the FGL magnetization to flip to a direction substantially anti-parallel to the WG field flux thereby increasing reluctance in the write gap, and enhancing the write field.

15. The STT assisted magnetic recording structure of claim 14 wherein the first SP layer is a SP2 layer in an antiferromagnetically coupled (AFC) SP configuration wherein the SP2 layer, a middle AFC layer, and an upper magnetic (SP1) layer are sequentially formed on NM1, and a top surface of the SP1 layer is the uppermost surface.

16. The STT assisted magnetic recording structure of claim 15 wherein the second SP layer is a single magnetic layer having a bottom surface that is the bottommost surface contacting the MP trailing side.

17. The STT assisted magnetic recording structure of claim 15 wherein the second SP layer is an uppermost (TSP3) layer in a triple AFC SP configuration wherein a first magnetic (TSP1) layer, first AFC layer, second magnetic (TSP2) layer, second AFC layer, and third magnetic (TSP3) layer are sequentially formed on the MP trailing side.

18. The STT assisted magnetic recording structure of claim 15 wherein the second SP layer is an uppermost (TSP3) layer in a triple AFC SP configuration wherein a first AFC coupling layer, a second magnetic (TSP2) layer, a second AFC layer and the TSP3 layer are sequentially formed on the MP trailing side, and a MP portion adjoining the magnetic flux guiding device bottommost surface has a third magnetization that is antiferromagnetically coupled to a TSP2 magnetization, and is parallel to the second magnetization.

19. The STT assisted magnetic recording structure of claim 14 wherein the first SP layer is a SP2 layer in an AFC SP configuration wherein a TS portion adjoining the magnetic flux guiding device uppermost surface has a third magnetization that is antiferromagnetically coupled to the first magnetization, and the SP2 layer and an AFC layer are sequentially formed on the NM1 such that a top surface of the AFC layer is the uppermost surface.

20. The STT assisted magnetic recording structure of claim 19 wherein the second SP layer is an uppermost (TSP3) layer in a triple AFC SP configuration wherein a first AFC coupling layer, a second magnetic (TSP2) layer, a second AFC layer and the TSP3 layer are sequentially formed on the MP trailing side, and a MP portion adjoining the magnetic flux guiding device bottommost surface has a fourth magnetization that is antiferromagnetically coupled to a TSP2 magnetization, and is parallel to the second magnetization.

21. The STT assisted magnetic recording structure of claim 19 wherein the second SP layer is an uppermost (TSP3) layer in a triple AFC SP configuration wherein a first magnetic (TSP1) layer, first AFC layer, second magnetic (TSP2) layer, second AFC layer, and third magnetic (TSP3) layer are sequentially formed on the MP trailing side.

22. The STT assisted magnetic recording structure of claim 14 wherein the first SP layer, second SP layer, and FGL are a single layer or alloy that is Fe, Co, Ni, CoFe, NiFe, or CoFeNi, or a multilayer of one or more of the aforementioned elements and alloys.

23. The STT assisted magnetic recording structure of claim 14 wherein one or both of NM1 and NM2 are one of Cu, Ag, Au, or a metal oxide.

24. A head gimbal assembly (HGA), comprising:
   (a) a slider on which the STT assisted magnetic recording structure of claim 14 is formed; and
   (b) a suspension that has a flexure to which the slider is joined, a load beam with one end connected to the flexure, and a base plate connected to the other end of the load beam.

25. A magnetic recording apparatus, comprising:
   (a) the HGA of claim 24;
   (b) a magnetic recording medium positioned opposite to the slider;
   (c) a spindle motor that rotates and drives the magnetic recording medium; and
   (d) a device that supports the slider, and that positions the slider relative to the magnetic recording medium.

26. A spin transfer torque (STT) assisted magnetic recording structure, comprising:
   (a) a main pole (MP) that is configured to generate a magnetic (write) field which is directed through a pole tip at an air bearing surface (ABS), and generates a write gap (WG) field flux in a down-track direction across the WG and a magnetic flux guiding device into a trailing shield;
   (b) the trailing shield (TS) with a side at the ABS, and wherein a portion of the TS at a magnetic flux guiding device top surface has a first magnetization in the WG field direction; and
   (c) the magnetic flux guiding device having the top surface contacting the TS, and a bottommost surface adjoining a MP trailing side, comprising:

(1) a field generation layer (FGL) with a magnetization pointing toward the TS and having an upper surface contacting a first non-magnetic spacer (NM1), and a lower surface contacting a second non-magnetic spacer (NM2);

(2) a spin polarization (SP) layer that adjoins NM2 and has a second magnetization substantially in a down-track direction toward the MP trailing side, and wherein the magnetic flux guiding device is configured so that when a direct current ($I_a$) of sufficient magnitude is applied from the TS to MP across the magnetic flux guiding device, the TS portion at the magnetic flux guiding device top surface and the SP layer exert an additive destabilizing spin torque on the FGL to cause the FGL magnetization to flip to a direction substantially anti-parallel to the WG field thereby increasing reluctance in the write gap, and enhancing the write field.

27. The STT assisted magnetic recording structure of claim 26 wherein the SP layer is a second magnetic (SP2) layer in an antiferromagnetically coupled SP configuration wherein a MP portion at the MP trailing side has a third magnetization that is antiferromagnetically coupled to the second magnetization, and an AFC coupling layer and the SP2 layer are sequentially formed on the MP trailing side.

28. The STT assisted magnetic recording structure of claim 26 wherein the SP layer is a SP2 layer in an antiferromagnetically coupled SP configuration wherein a first magnetic (SP1) layer, a middle AFC layer, the SP2 layer are sequentially formed on the MP trailing side.

29. A spin transfer torque (STT) assisted magnetic recording structure, comprising:
(a) a main pole (MP) that is configured to generate a magnetic (write) field which is directed through a pole tip at an air bearing surface (ABS), and generates a write gap (WG) field flux in a down-track direction across the WG and a magnetic flux guiding device into a trailing shield, and wherein a MP portion at a MP trailing side has a first magnetization in a direction substantially parallel to the WG field flux;
(b) a trailing shield (TS) with a side at the ABS, and wherein a portion of the TS at a magnetic flux guiding device top surface has a first magnetization in the WG field direction; and
(c) the magnetic flux guiding device having the top surface contacting the TS, and a bottommost surface adjoining the MP portion at the MP trailing side, comprising:
(1) a field generation layer (FGL) with a magnetization pointing toward the TS and having an upper surface contacting a first non-magnetic spacer (NM1), and a lower surface contacting a second non-magnetic spacer (NM2);
(2) a spin polarization (SP) layer that adjoins NM1 and has a second magnetization substantially in the down-track direction toward the MP trailing side, and wherein the magnetic flux guiding device is configured so that when a direct current ($I_a$) of sufficient magnitude is applied from the MP to TS across the magnetic flux guiding device, the MP portion at the magnetic flux guiding device bottommost surface and the SP layer exert an additive destabilizing spin torque on the FGL to cause the FGL magnetization to flip to a direction substantially anti-parallel to the WG field thereby increasing reluctance in the write gap, and enhancing the write field.

30. The STT assisted magnetic recording structure of claim 29 wherein the SP layer is a second magnetic (SP2) layer in an antiferromagnetically coupled SP configuration wherein the SP2 layer, and an AFC layer are sequentially formed on NM1, the first magnetization is antiferromagnetically coupled to the second magnetization, and the AFC layer is the uppermost layer in the magnetic flux guiding device.

31. The STT assisted magnetic recording structure of claim 29 wherein the SP layer is a SP2 layer in an antiferromagnetically coupled SP configuration wherein the SP2 layer, a middle AFC layer, a second (SP1) layer are sequentially formed on NM1 and the SP1 layer is the uppermost layer in the magnetic flux guiding device.

32. A method of forming a spin transfer torque (STT) assisted magnetic recording structure, comprising:
(a) providing a main pole (MP) with a tapered trailing side that extends from an air bearing surface (ABS) plane to a first height (a) where the MP tapered trailing side connects with a MP top surface aligned orthogonal to the ABS plane and having a first dielectric layer formed thereon, and wherein the MP is separated from a side shield on each side of a center plane by a side gap;
(b) depositing a magnetic flux guiding stack of layers on a top surface of the MP tapered trailing side, first dielectric layer, side gaps, and side shields; the magnetic flux guiding stack of layers is bisected by the center plane and comprises:
(1) a field generation layer (FGL);
(2) a first non-magnetic (NM1) layer and a second non-magnetic (NM2) layer that adjoin a top surface and bottom surface, respectively, of the FGL;
(3) a first spin polarization (SP) layer on a top surface of the NM1 layer; and
(4) a second SP layer contacting a bottom surface of the NM2 layer;
(c) patterning the magnetic flux guiding stack of layers to form a magnetic flux guiding device with two sides that are separated by a cross-track width (w), and a backside at a second height (h) where h<a, and depositing a write gap layer on exposed portions of the side gaps and side shields that are not covered by the magnetic flux guiding device;
(d) depositing a first trailing shield (TS) layer on the magnetic flux guiding device and the write gap;
(e) patterning the first TS layer and write gap to form sides thereon, the first TS layer and write gap are bisected by the center plane and each have a width w2 where w2>w; and
(f) depositing a second TS layer on the first TS layer and on exposed portions of the side shields, wherein the magnetic flux guiding device is configured with a FGL magnetization (m3) pointing toward the first TS layer, and one of the first and second SP layers has a first magnetization that is parallel to m3 while the other of the first and second SP layers has a magnetization opposite to m3 so that the FGL magnetization flips to a direction substantially orthogonal to the MP tapered trailing side during a write process.

33. The method of claim 32 wherein one of the first and second SP layers is a SP2 layer in SP2/AFC coupling layer/SP1 configuration wherein the SP2 and SP1 layers are antiferromagnetically coupled through the AFC coupling layer, and the SP1 layer contacts either the MP trailing side or the first TS layer.

34. The method of claim 33 wherein the other of the first and second SP layers is a single SP layer, or is a TSP3 layer in a TSP1/AFC1/TSP2/AFC2/TSP3 configuration wherein the TSP3 and TSP2 layers are antiferromagnetically coupled through the second AFC (AFC2) layer, and the TSP2 and TSP1 layers are antiferromagnetically coupled through the first AFC (AFC1) layer, and the single SP layer or TSP1 layer contacts the other of the MP trailing side or the first TS layer that is not contacted by the SP1 layer.

35. The method of claim 32 wherein the first SP layer, second SP layer, and FGL are a single layer or alloy that is Fe, Co, Ni, CoFe, NiFe, or CoFeNi, or a multilayer of one or more of the aforementioned elements and alloys.

36. The method of claim 32 wherein one or both of NM1 and NM2 are one of Cu, Ag, Au, or a metal oxide.

* * * * *